US008387596B2

(12) United States Patent
Wilson

(10) Patent No.: US 8,387,596 B2
(45) Date of Patent: Mar. 5, 2013

(54) INJECTION PLATE ASSEMBLY FOR INJECTION OF A PRIMARY FUEL AND AN ACCELERANT

(76) Inventor: Steve Wilson, Hamburg, PA (US)

( * ) Notice: Subject to any disclaimer, the term of this patent is extended or adjusted under 35 U.S.C. 154(b) by 435 days.

(21) Appl. No.: 12/782,133

(22) Filed: May 18, 2010

(65) Prior Publication Data

US 2011/0120434 A1 May 26, 2011

Related U.S. Application Data

(60) Provisional application No. 61/264,411, filed on Nov. 25, 2009.

(51) Int. Cl.
*F02M 19/03* (2006.01)
*B01D 47/06* (2006.01)

(52) U.S. Cl. ......................... 123/585; 123/590; 261/118

(58) Field of Classification Search .................. 123/585, 123/590; 261/118
See application file for complete search history.

(56) References Cited

U.S. PATENT DOCUMENTS

| | | | |
|---|---|---|---|
| 1,627,727 | A | 5/1927 | Charter |
| 2,482,864 | A | 9/1949 | Nemnich |
| 3,182,646 | A | 5/1965 | Kuechenmeister |
| 3,610,213 | A | 10/1971 | Gianini |
| 4,157,084 | A | 6/1979 | Wallis |
| 4,211,200 | A | 7/1980 | Rocchio et al. |
| 4,355,623 | A | 10/1982 | Graham |
| 4,494,488 | A | 1/1985 | Wheatley |
| 4,572,140 | A | 2/1986 | Wheatley |
| 4,628,890 | A | 12/1986 | Freeman |
| 4,672,940 | A | 6/1987 | Nakayama et al. |
| 4,674,466 | A | 6/1987 | Jung-Kwang |
| 4,683,843 | A | 8/1987 | Norcia et al. |
| 4,798,190 | A | 1/1989 | Vaznaian et al. |
| 4,827,888 | A | 5/1989 | Vaznaian et al. |
| 5,269,275 | A | 12/1993 | Dahlgren |

(Continued)

OTHER PUBLICATIONS

Product Catalog, "NX Nitrous Express Next Generation Nitrous System", vol. 6.1, pp. 48-49 (4 pages), Nitrous Express Inc., Wichita Falls, TX.

(Continued)

*Primary Examiner* — Noah Kamen
(74) *Attorney, Agent, or Firm* — Volpe and Koenig, P.C.

(57) ABSTRACT

An injection plate assembly for an internal combustion engine that includes a manifold and carburetor or throttle body is provided for injection of a primary fuel and an accelerant into throttle bore(s) of the manifold. The injection plate assembly is adapted to be installed between the manifold and the carburetor. In order to equalize injection of both the primary fuel and the accelerant, the lower plate includes at least two fuel inlet ports that provide fuel at opposing sides of the lower plate. The upper plate includes at least two accelerant or additive inlet ports that provide accelerant to opposite sides of the upper plate, with the accelerant inlet ports being located on different sides of the injection plate assembly from the fuel inlet ports on the lower plate. To further improve flow of the accelerant to the injection gates in the upper plate, the runners in the upper plate define paths that have internal corners having a radius of 0.10 inches or greater. This ensures less head loss for the high pressure accelerant as it is delivered via the runners to the injection gates which normalizes the accelerant delivery from the injection gates at all sides of the main apertures.

19 Claims, 41 Drawing Sheets

U.S. PATENT DOCUMENTS

| | | | |
|---|---|---|---|
| 5,287,828 | A | 2/1994 | Kennedy |
| 5,449,120 | A | 9/1995 | Tani et al. |
| 5,482,079 | A | 1/1996 | Bozzelli |
| 5,699,776 | A | 12/1997 | Wood et al. |
| 5,743,241 | A | 4/1998 | Wood et al. |
| 5,839,418 | A | 11/1998 | Grant |
| 6,378,512 | B1 | 4/2002 | Staggemeier |
| 2008/0110436 | A1 | 5/2008 | Baasch et al. |
| 2009/0188480 | A1 | 7/2009 | Acker et al. |

OTHER PUBLICATIONS

Product Catalog, "Nitrous Pro-Flow", vol. XIV, pp. 16-17 (4 pages), Wilson Manifolds, Ft. Lauderdale, FL.

Product Catalog, "NOS 2000 Catalog", pp. 14, 17, 28, 36, 49 (7 pages), 2000; Nitrous Oxide Systems, Costa Mesa, CA.

Product Catalog, "Zex, Performance Catalog"; ZEX 101-105, pp. 6, 10 (4 pages), 2005; Zex Performance Products, Memphis, TN.

INJECTION PLATE ASSEMBLY FOR INJECTION OF A PRIMARY FUEL AND AN ACCELERANT

CROSS-REFERENCE TO RELATED APPLICATIONS

This application claims the benefit of U.S. Provisional Application No. 61/264,411, filed Nov. 25, 2009, which is incorporated herein by reference as if fully set forth.

BACKGROUND

The present invention relates to the field of nitrous injection as a fuel additive for internal combustion engines, and more particularly to an improved injection plate for spray injection of nitrous oxide and fuel to increase engine power output.

An injection plate for spray injection of nitrous oxide along with fuel is known from Applicant's prior U.S. prior patent application Ser. No. 12/327,028, filed Dec. 3, 2008 and published as U.S. 2009/0188480, which is incorporated herein by reference as if fully set forth. In this prior application, single stage and dual stage injection plate assemblies were disclosed with precision edge gate discharge openings for injection of a primary fuel and a nitrous oxide accelerant into the throttle bores and/or manifold plenum of an internal combustion engine. The assembly was interposed between a carburetor and the inlet throat openings of the manifold and could be installed in a simple manner without excessively raising the height of the carburetor above the manifold. This made the device suitable for retrofitting on existing engines in order boost power output from the engine through the injection of a nitrous oxide/fuel mixture from the injection plate into the manifold openings along with the fuel/air mixture coming through the carburetor.

A problem found with this prior device was that the nitrous oxide and the fuel being delivered to the throttle bore were not evenly distributed between the four throttle bore openings. This could result in rough engine running and increased loading or wear due to the pistons of each of the combustion chambers providing uneven power to the crankshaft. In extreme cases, it could also lead to pistons melting and catastrophic failure of the engine due to uneven or inadequate distribution. It is therefore desired to provide an improved injection plate in which the output to all four throttle bores is normalized. Further, better distribution of the nitrous and fuel to each of the throttle bores is desired while still allowing for a modular assembly which can be easily installed and/or retrofitted into existing engines.

SUMMARY

An injection plate assembly for an internal combustion engine that includes a manifold and carburetor is provided for injection of a primary fuel and an accelerant into a throttle bore of the manifold. The injection plate assembly is adapted to be installed between the manifold and the carburetor or throttle body and includes a lower plate having a main aperture adapted to be aligned with the throttle bores of the manifold with runners defined in the plate for carrying the primary fuel from a fuel inlet port to the main apertures. An intermediate plate is located on the lower plate and includes an aligned main aperture. A plurality of injection ports are defined in the lower face of the intermediate plate which established a fluid path with the runners in the lower plate in order to allow fuel to be injected into the main aperture. An upper plate is located over the intermediate plate and includes a plurality of runners in fluid communication between additive inlet ports and injection gates located around the main aperture. The main apertures in the lower plate, intermediate plate and upper plate are aligned with the throttle bore of the manifold in order to inject a high pressure accelerant and fuel into the main apertures.

The additive injection gates in the upper plate are located above and in aligned positions with the fuel injection ports defined between the intermediate plate and the lower plate. In order to equalize injection of both the primary fuel and the accelerant, the lower plate includes at least two fuel inlet ports that deliver fuel to opposing sides of the lower plate for the primary fuel. The upper plate includes at least two accelerant or additive inlet ports that deliver fuel to opposite sides of the upper plate, with the accelerant inlet ports delivering accelerant to different sides of the injection plate assembly from the fuel inlet ports on the lower plate. In order to improve flow of the accelerant to the injection gates in the upper plate, the runners in the upper plate are defined as grooves with the corners along the groove paths having a radius of 0.10 inches or greater. This ensures less head loss for the high pressure accelerant as it is delivered via the runners to the injection gates which normalizes the accelerant delivery from the injection gates at all sides of the main apertures. Surprisingly, this is not required in the lower pressure fuel delivery runners located in the lower plate. While those of ordinary skill in the art would believe that it would be more critical to prevent head loss in the lower pressure fuel runners, and less critical in the high pressure additive or accelerant runners, the inventor has discovered that the opposite case is true. Further, the inventor has determined that providing fuel delivery to opposing sides as well as the additive to opposing sides of the injection plate assembly further improves fuel and accelerant distribution and therefore enhances performance.

A multi-stage injection plate assembly is also provided having a plurality of stacked plates in order to provide multiple pairs of fuel injection ports which are located beneath correspondingly located accelerant injection gates located around the main aperture leading to the throttle bore in an engine manifold. The multi-stage injection plate assembly similarly utilizes primary fuel inlet ports that deliver fuel to opposite side of each fuel injection plate as well as accelerant inlet ports that deliver accelerant to opposite sides of each accelerant injection plate for each stage in order to normalize the flow of both the primary fuel and the accelerant to the throttle bore of the manifold. Additionally, the runners in the plates carrying the accelerant to the main apertures includes turns with an inside radius of at least 0.10 inches in order to minimize head loss and further equalize accelerant delivery to each of the main apertures.

The single and multi-stage injection plates can include one or multiple main apertures, depending on the specific intake manifold arrangement.

BRIEF DESCRIPTION OF THE DRAWINGS

The foregoing summary and the following detailed description will be better understood when read in conjunction with the appended drawings, which illustrate preferred embodiments of the invention. In the drawings.

DETAILED DESCRIPTION OF THE PREFERRED EMBODIMENTS

Figure 1A:
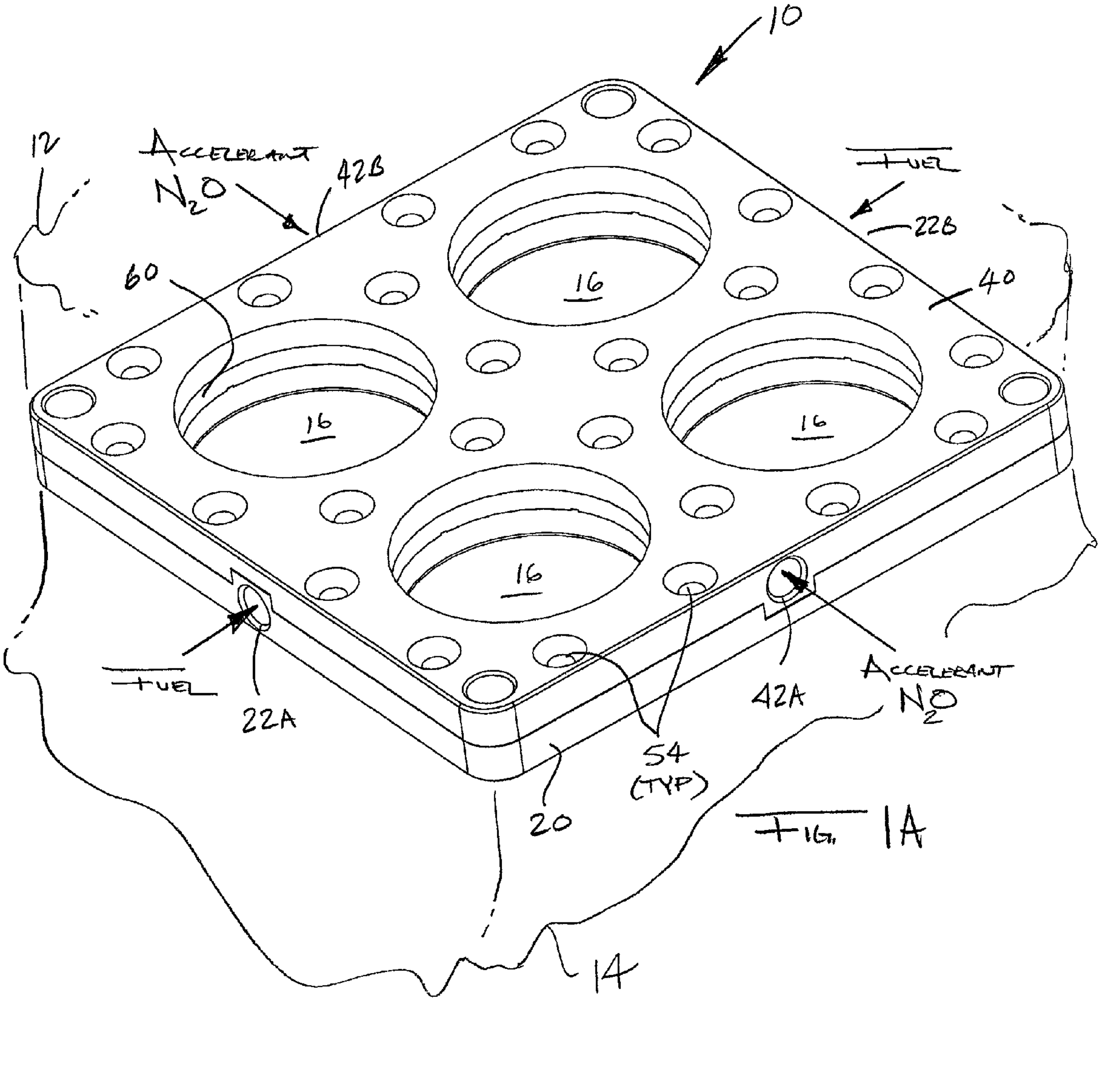
FIG. 1A is a perspective view of a first embodiment of a single stage throttle plate assembly in accordance with the present invention.

Certain terminology is used in the following description for convenience only and is limiting. The words “front,” “back,” “top” and “bottom” designate directions in the drawings to which reference is made. The words “inwardly” and “outwardly” refer to the directions toward and away from the parts referenced in the drawings. “(TYP)” as indicated in the drawings indicates a repetitive feature that is not separately designated with a reference number at each location. A reference to a list of items that are cited as “at least one of a, b or c” (where a, b and c represent the items being listed) means any single one of the items a, b or c, or combinations thereof. The terminology includes the word specifically noted above, derivatives thereof and words of similar import.

Figure 1B:
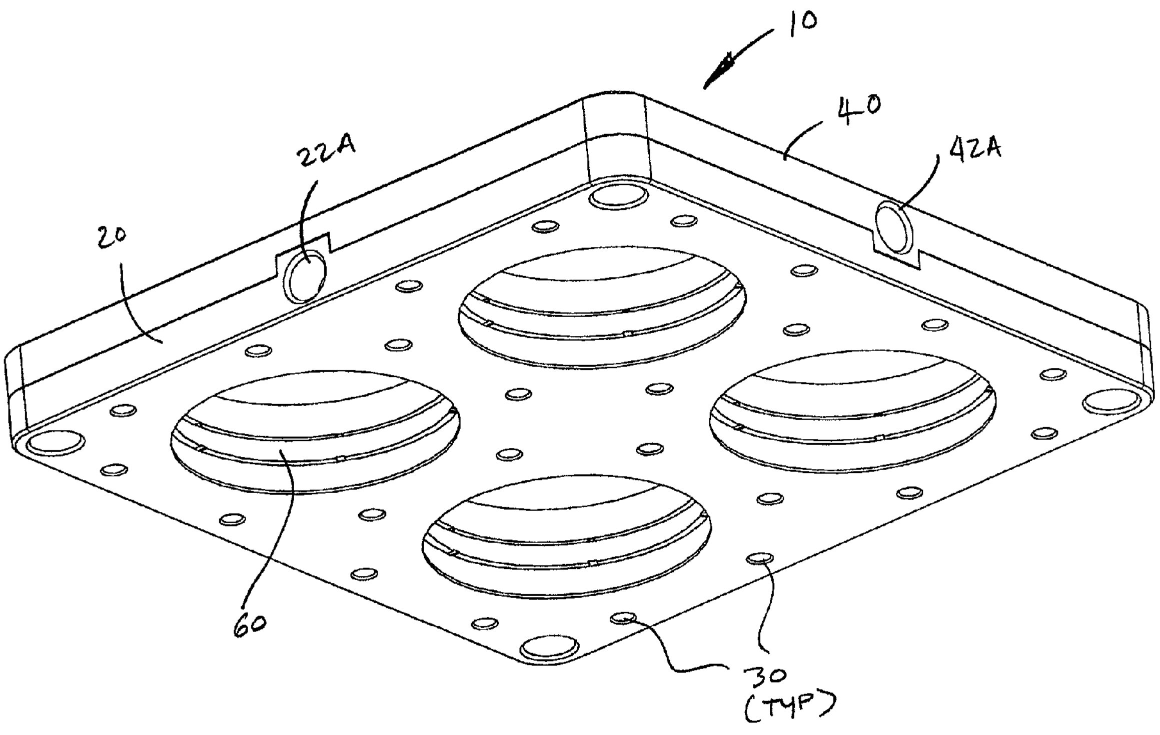
FIG. 1B is a bottom front, right perspective view of the throttle plate assembly of FIG. 1.

Referring to FIGS. 1A, 1B, 2A and 2B, a first embodiment of a single stage injection plate assembly 10 is shown in detail. FIGS. 1A and 1B show top and bottom view of the injection plate assembly 10 which is installed between the manifold 14 of an internal combustion engine (indicated in dashed lines in FIG. 1A) and the carburetor 12 (also indicated in dashed lines). The injection plate assembly 10 includes openings which are aligned with the throttle bores 16 in both the manifold and carburetor. As indicated in FIG. 1A, the single stage injection plate assembly 10 receives fuel and an accelerant such as nitrous oxide, into side ports and distributes a flow of both the accelerant and the fuel to the throttle bores 16. Preferably, the throttle plate assembly 10 is separately controlled from the normally aspirated fuel/air mixture which also travels from the carburetor 12 into the throttle bore 16 of the manifold 14, thus increasing the amount of fuel and accelerant supplied to the engine in order to increase engine power output. The accelerant, preferably nitrous oxide, is initially in the form of a high velocity liquid from a tank maintaining a pressure generally in the range of 800 to 1000 psi, which is delivered to the injection plate assembly 10 via tubing (not shown) through separately controlled solenoid valves which are activated by a driver when an additional boost of power is required from the engine. Fuel is also supplied through the fuel inlets through separately actuated solenoid control valves and, as described in U.S. 2009/0188480, the accelerant is directed at a selected discharge angle through injection ports and intersects the fuel stream and causes atomization of the fuel as a result of shearing of the stream of high velocity atomized microdrops of accelerant. However, in the prior device according to U.S. 2009/0188480, the amount of mixed fuel and accelerant delivered to each of the throttle bores was inconsistent, resulting in uneven combustion power delivered by the separate cylinders of the internal combustion engine. Here, the accelerant and fuel are delivered by accelerant gates/fuel injection port pairs as described in detail below, with the accelerant sprayed from each gate/port pair entering the respective throttle bores 16 in a controlled dispersal pattern in an evenly dispersed, homogenized blend so that the fuel and accelerant delivered to each of the throttle bores is generally the same.

Figure 2A:
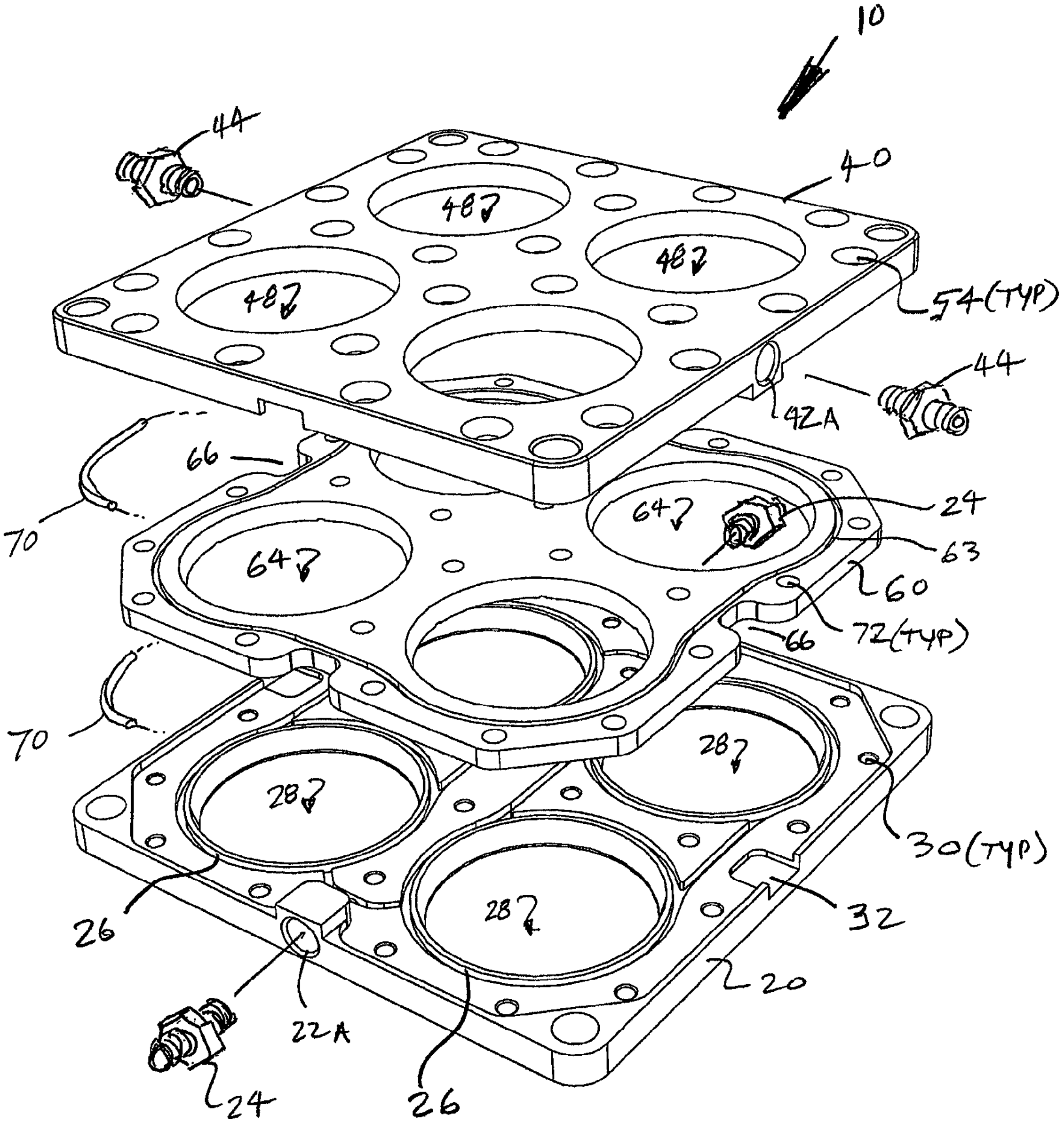
FIG. 2A is an exploded front, top, right perspective view of the throttle plate assembly of FIG. 1A.
Figure 2B:
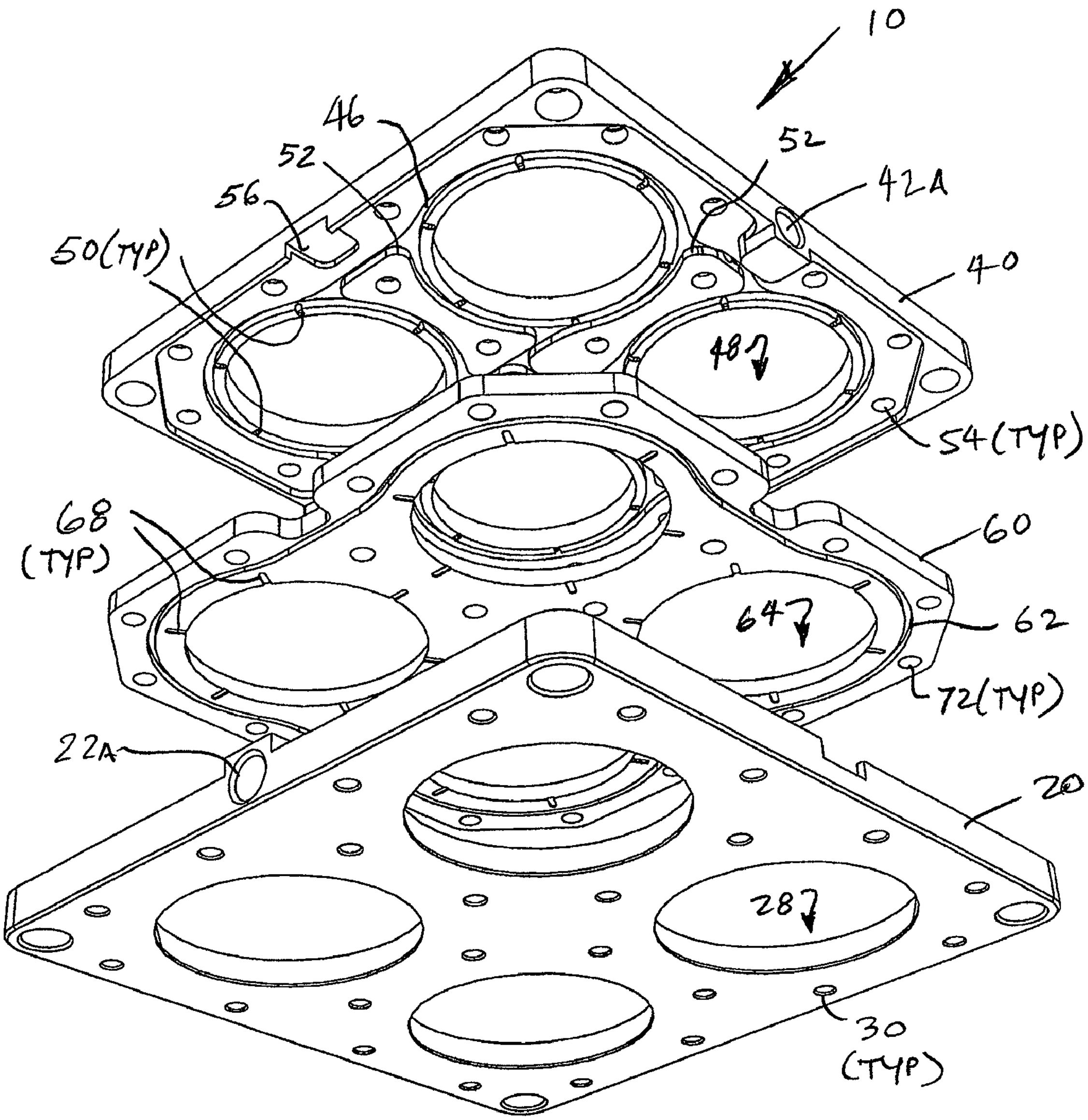
FIG. 2B is an exploded bottom, front, right perspective view of the throttle plate assembly of FIG. 1A.

Still with reference to FIGS. 1A, 1B, 2A and 2B, the single stage injection plate assembly 10 includes a lower plate 20 having fuel inlet ports 22A and 22B located on opposing sides. As shown in FIG. 2A, preferably connection fittings 24 are threaded into the fuel inlet ports 22A, 22B. As shown most clearly in FIG. 2A and FIGS. 9 and 10, the lower plate 20 includes runners 26 that extend from the inlet ports 22A and 22B to deliver fuel to the main apertures 28, which are aligned with the throttle bores 16 of the carburetor 12 and manifold 14. The main apertures 28 include tapered sidewalls, shown in detail in FIGS. 13 and 14. The runners 26 include generally circular grooves 26A defined around each of the main apertures 28 and generally longitudinally extending runner segments 26B which connect generally tangentially to the sides of the circular runner grooves 26A defined about the main apertures 28. The runner segments 26B extend in the same direction as a center line extending between the opposing fuel inlet ports 22A, 22B, which are on opposing sides of the lower plate 20. Transverse connector grooves 26C extend from the openings of the fuel inlet ports 22A, 22B in a transverse direction to the center line extending between the inlet ports 22A, 22B to connect with the adjacent circular grooves 26A. In the preferred embodiment, the grooves have a width of approximately 0.07 to 0.09 inches and, most preferably have a width in the range of approximately 0.076 to approximately 0.080. The grooves preferably have a depth of approximately 0.08 to approximately 0.10 inches and more preferably have a depth in the range of approximately 0.09 inches. Internal corner radii defining the boundaries of the groove paths and at intersections preferably having a radius of 0.016 inches.

Figure 9:
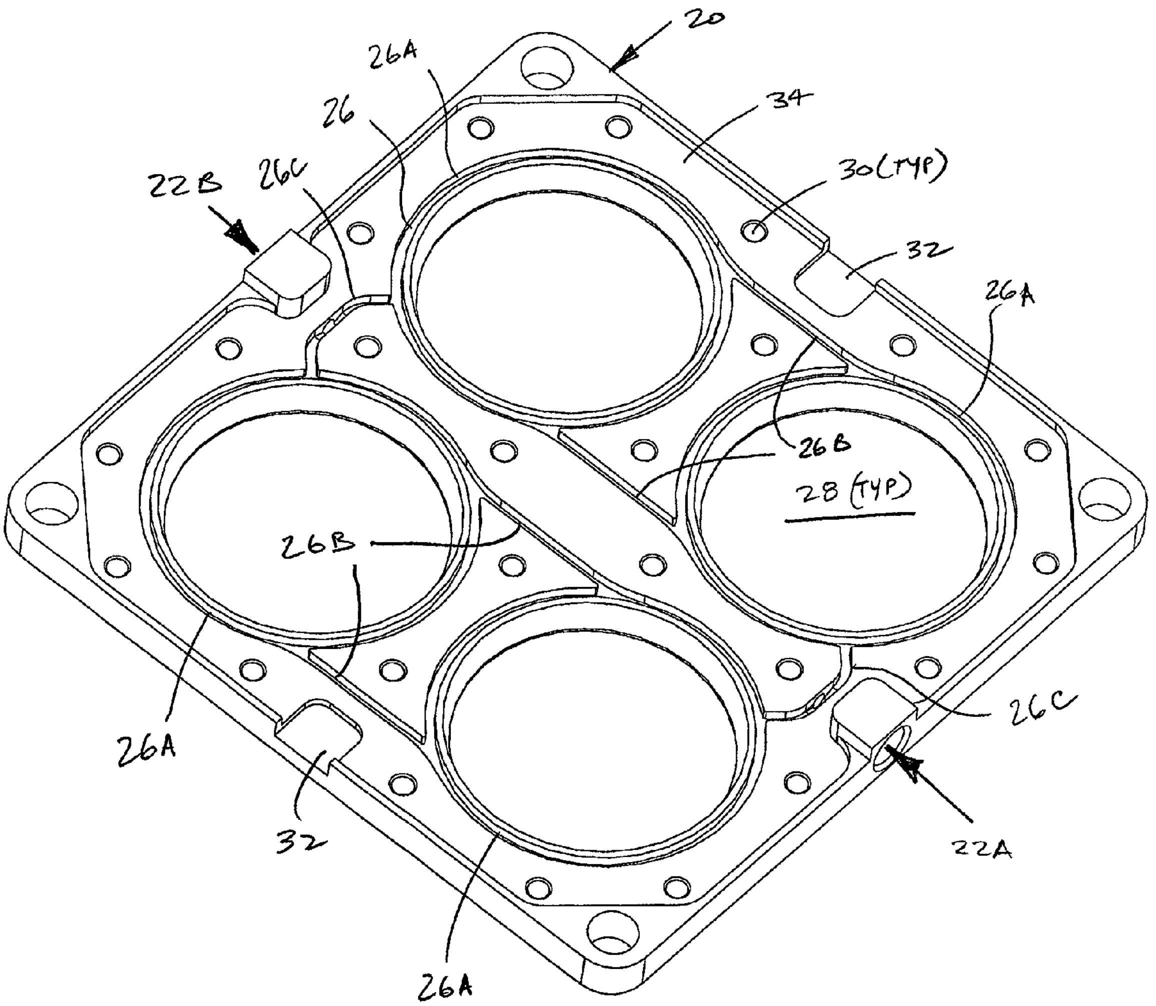
FIG. 9 is a top, front, right perspective view of the bottom plate showing the runners for the primary fuel.
Figure 10:
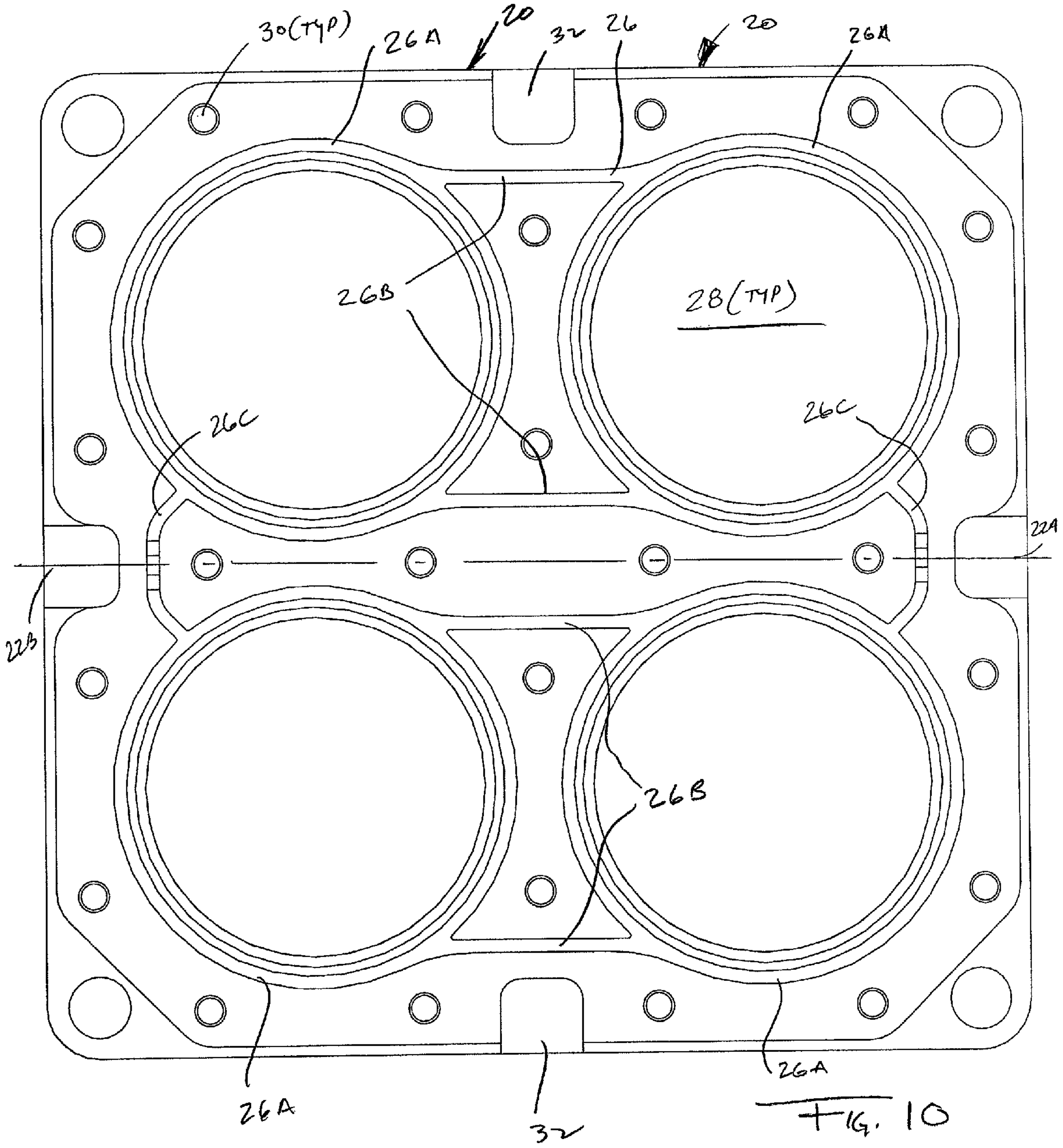
FIG. 10 is a top plan view of the bottom plate.
Figure 11:
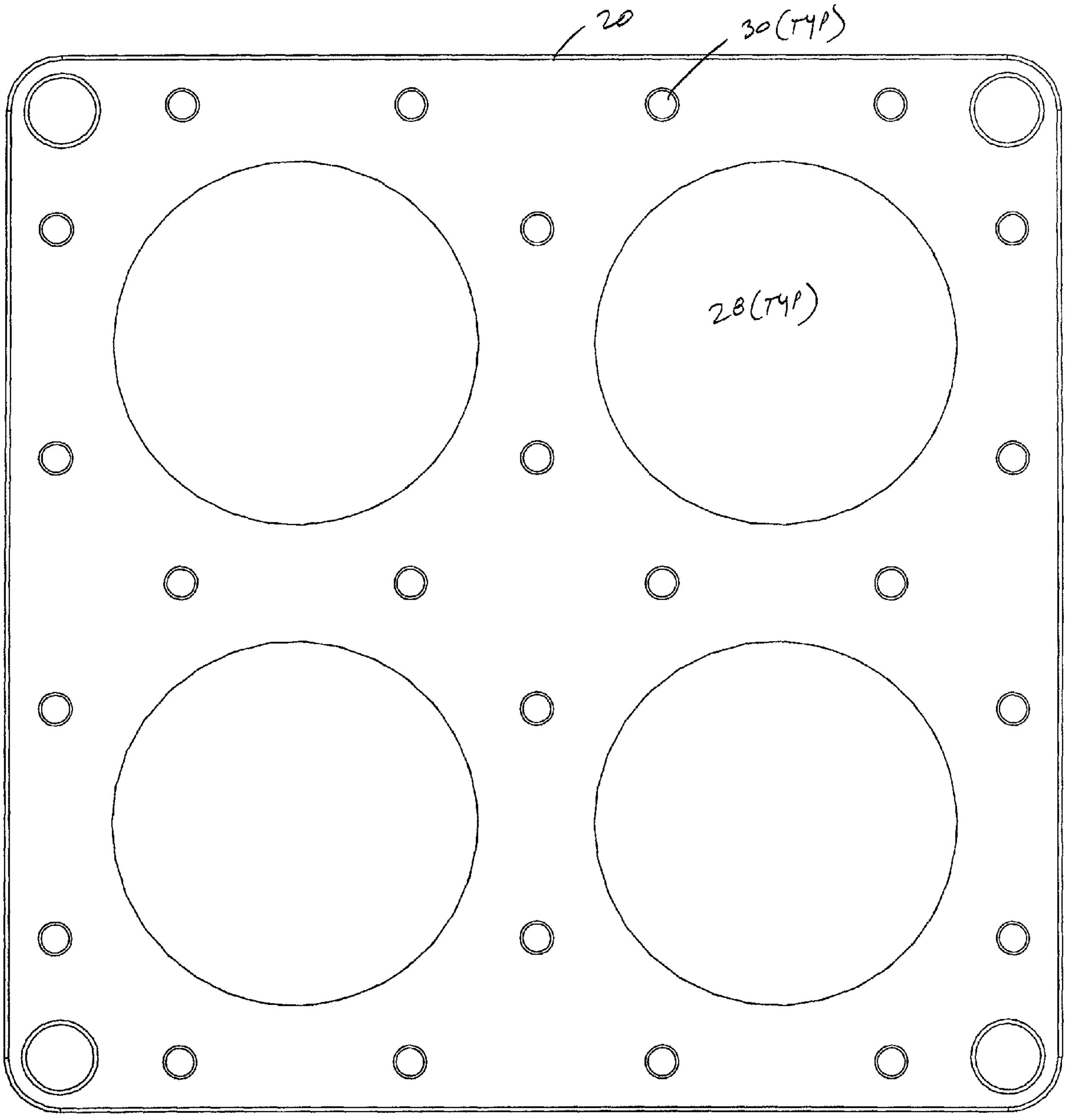
FIG. 11 is bottom view of the bottom plate.
Figure 12:
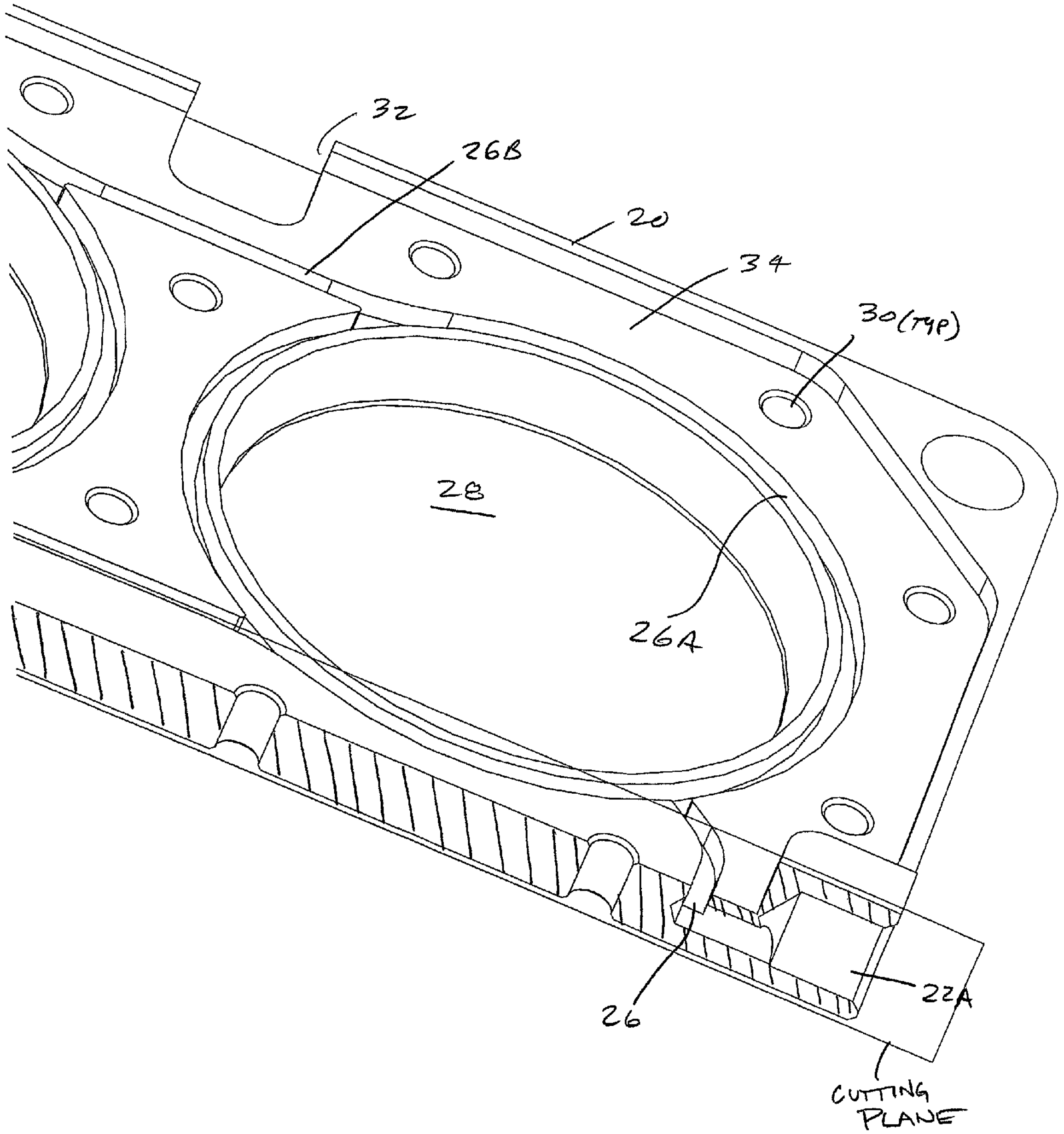
FIG. 12 is an enlarged cross-sectional view through a portion of the bottom plate taken at the fuel inlet port.

As shown in detail in FIGS. 9 and 10, notches 32 are defined on the opposing sides of the lower plate 20 from the fuel inlet ports 22A, 22B for alignment with the upper plate 40 and intermediate plate 60 which are described in detail below. Fastener holes 30 are defined in the lower plate 20 for assembly of the injection plate assembly 10. Additionally, in order to maintain a reduced height for the injection plate assembly 10, a recessed surface 34 is defined over the area surrounding the main apertures 28 and the runners 26.

Still with reference to FIGS. 2A, 2B, 6 and 7, an intermediate plate 60 is located on the lower plate 20. The intermediate plate 60 includes main apertures 64 which are aligned with the main apertures 28 of the lower plate 20 as well as the throttle bores 16 in the manifold 14. Surrounding the main apertures 64 on a lower side of the intermediate plate 60 are a plurality of spaced apart injection ports 68. In a preferred embodiment, six equally spaced injection ports 68 are provided around the periphery of and extending into the main aperture 64. As shown in detail in FIGS. 13 and 14, the injection port 68 extend such that they overlap both the circular runners 26 surrounding the main apertures 28 of the lower plate 20 as well as the upper lip of the main apertures 28 in the lower plate 20 in order to provide a fluid path from the fuel runners 26 in the lower plate to the main apertures 28 and the throttle bores 16 in the manifold 14.

The intermediate plate also includes a groove 62 on the lower face for an O-ring or gasket seal, and a periphery of the intermediate plate matches the periphery of the intermediate plate recess 34 in the lower plate 20. Notches 66 are provided along each side of the intermediate plate 60 in aligned positions with the fuel inlet ports 22A, 22B in the lower plate 20 as well as the additive inlet ports 42A, 42B in the upper plate 40, described in further detail below. Aligned fastener holes 72 are provided in complementary positions to the fastener holes 30 of the lower plate 20.

Figure 6:
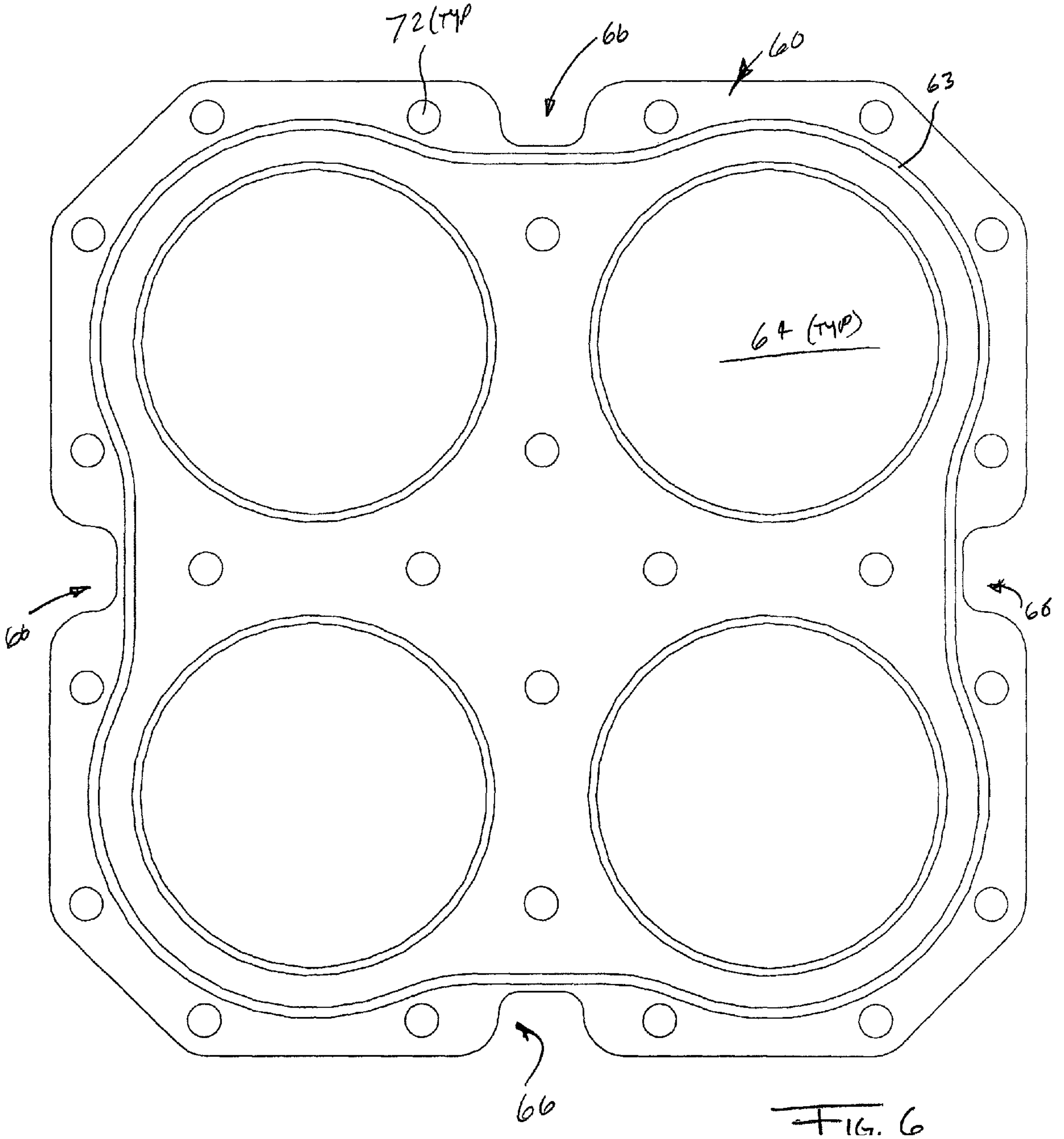
FIG. 6 is a top plan view of the intermediate plate.
Figure 7:
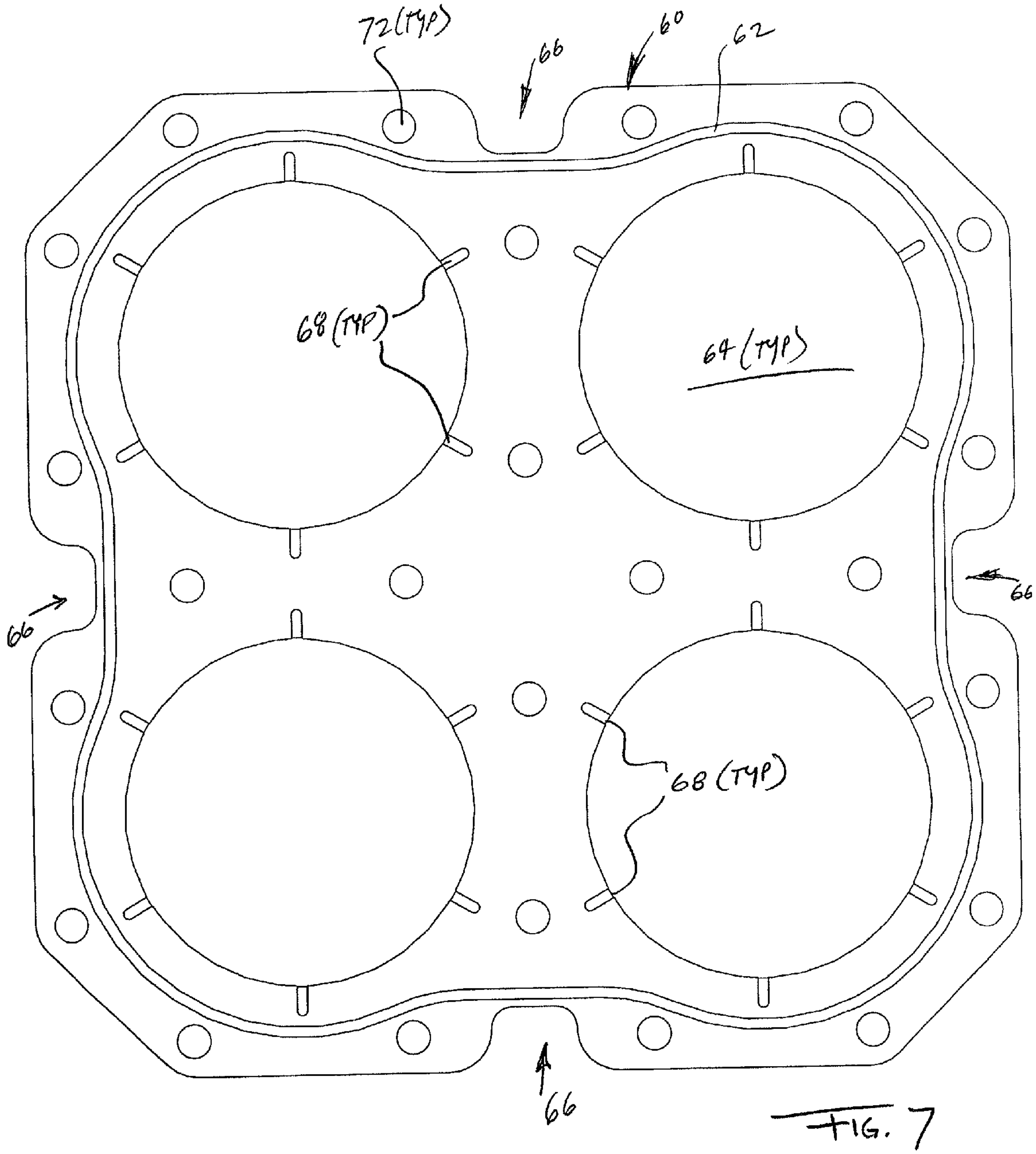
FIG. 7 is a bottom plan view of the intermediate plate showing the fuel inlet ports.
Figure 8:
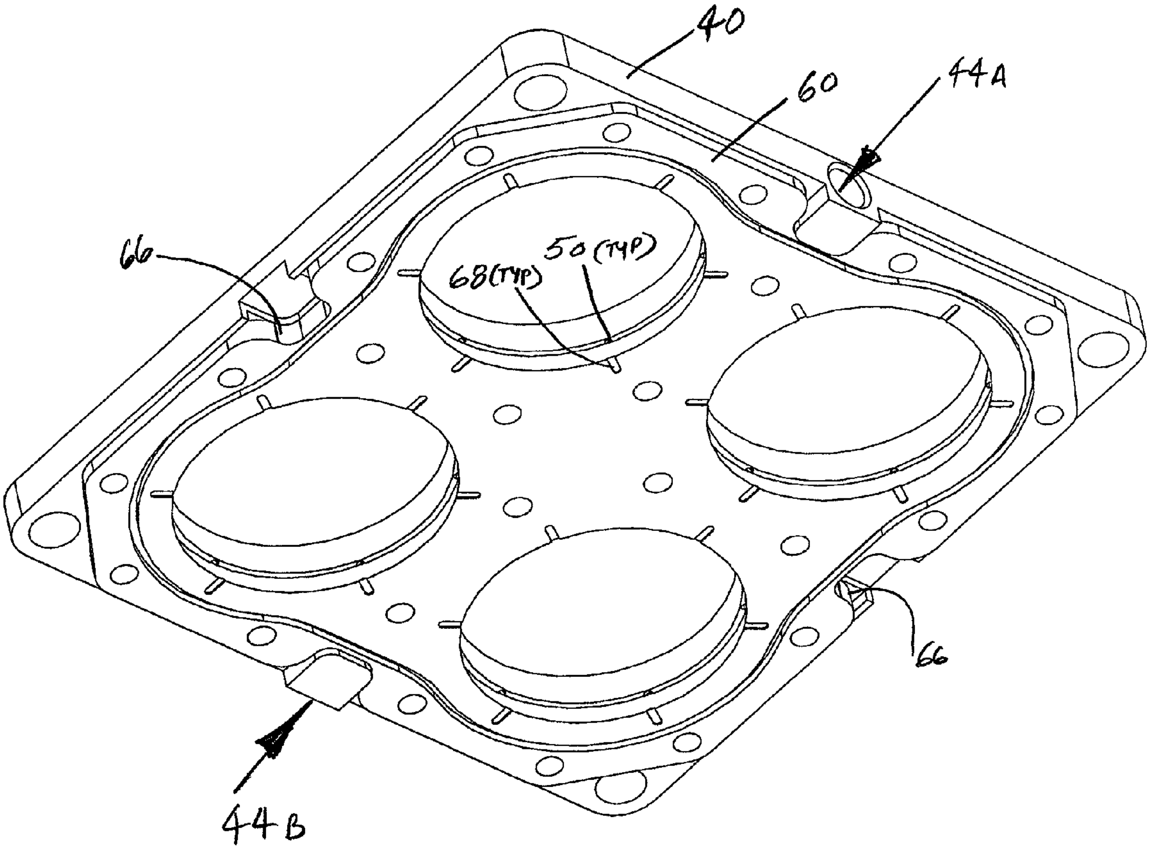
FIG. 8 is a bottom, front, right perspective view showing the top plate and intermediate plate in the partially assembled state.

Referring to FIG. 6, the upper side of the intermediate plate 60 is shown which also includes a gasket groove 63 for an O-ring or gasket in order seal the intermediate plate to the upper plate 40.

Referring to FIGS. 2A, 2B and 3-5, the upper plate 40 is located above the intermediate plate 60. The upper plate 40 includes additive inlet ports 42A, 42B located on opposite sides thereof. The additive ports 42A, 42B are located on the sides of the injection plate assembly 10 that are adjacent to the sides which include the fuel inlet ports 22A, 22B. This provides an arrangement where a center line extending between the additive ports 42A, 42B is generally perpendicular to the center line extending between the fuel inlet ports 22A, 22B. As shown in FIG. 2A, fittings 44 are provided for connecting the additive inlet ports 42 to additive lines (not shown), such as lines extending from a high pressure accelerant tank, such as a tank of nitrous oxide.

Figure 3:
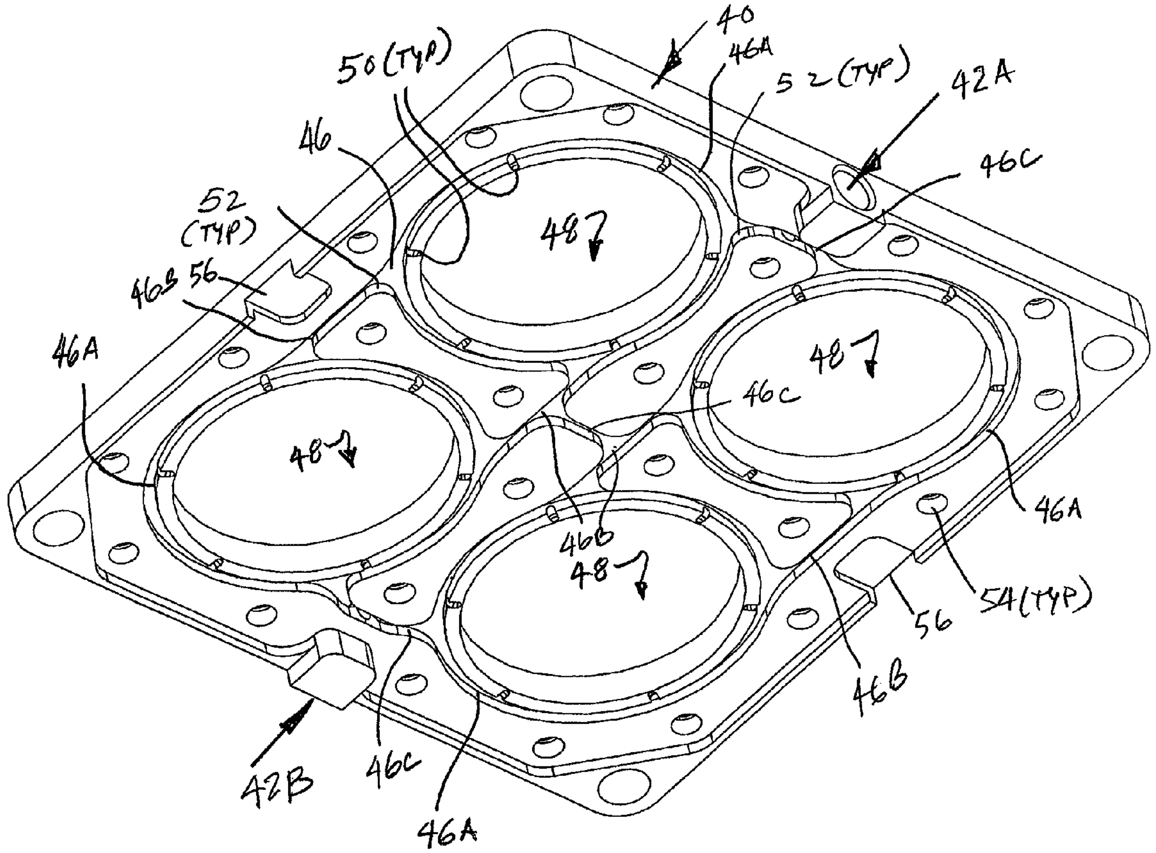
FIG. 3 is a bottom perspective view of the top plate.
Figure 4:
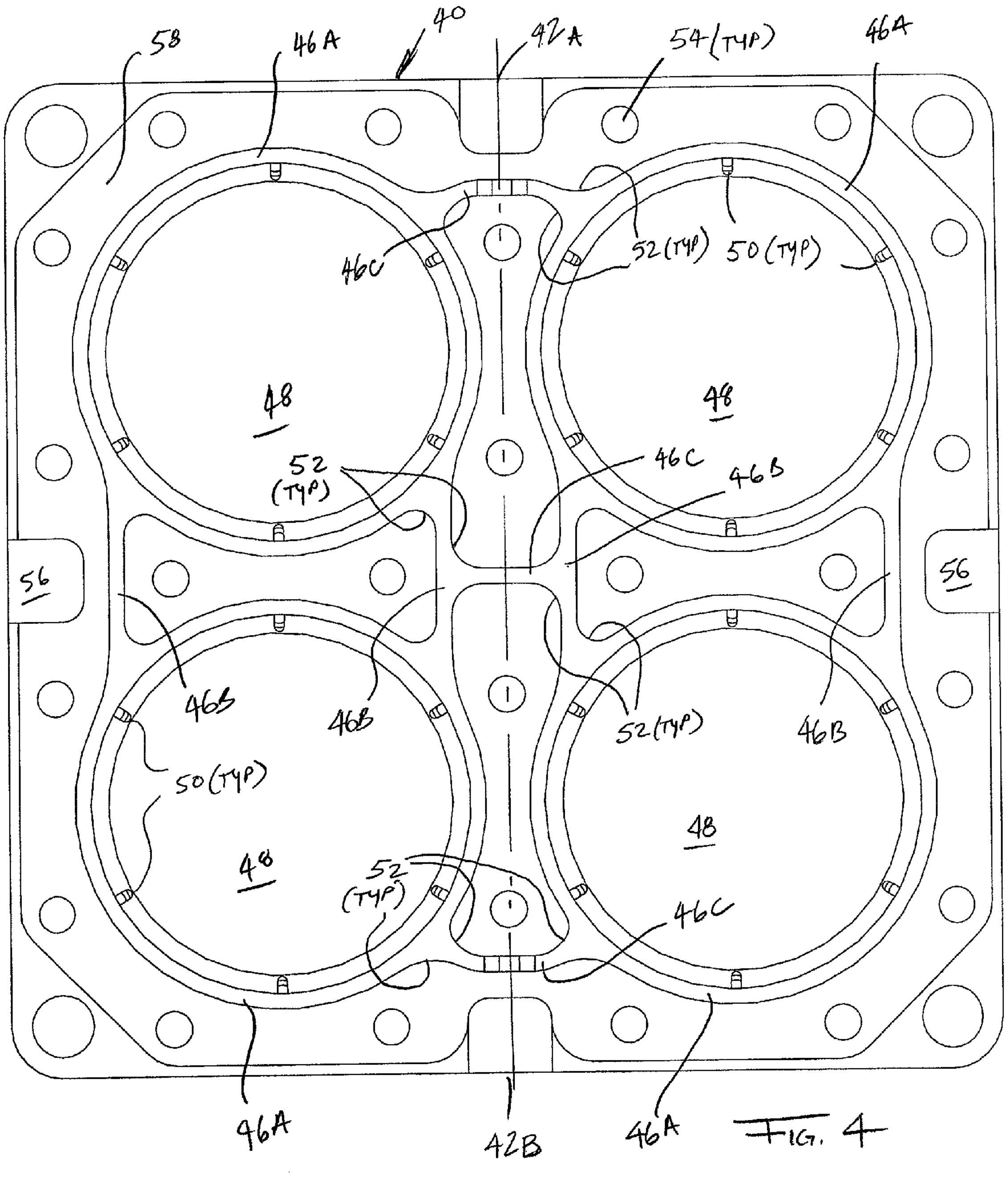
FIG. 4 is a bottom plan view of the top plate showing the runners and injection gates for injecting an additive or an accelerant in the main aperture.
Figure 5:
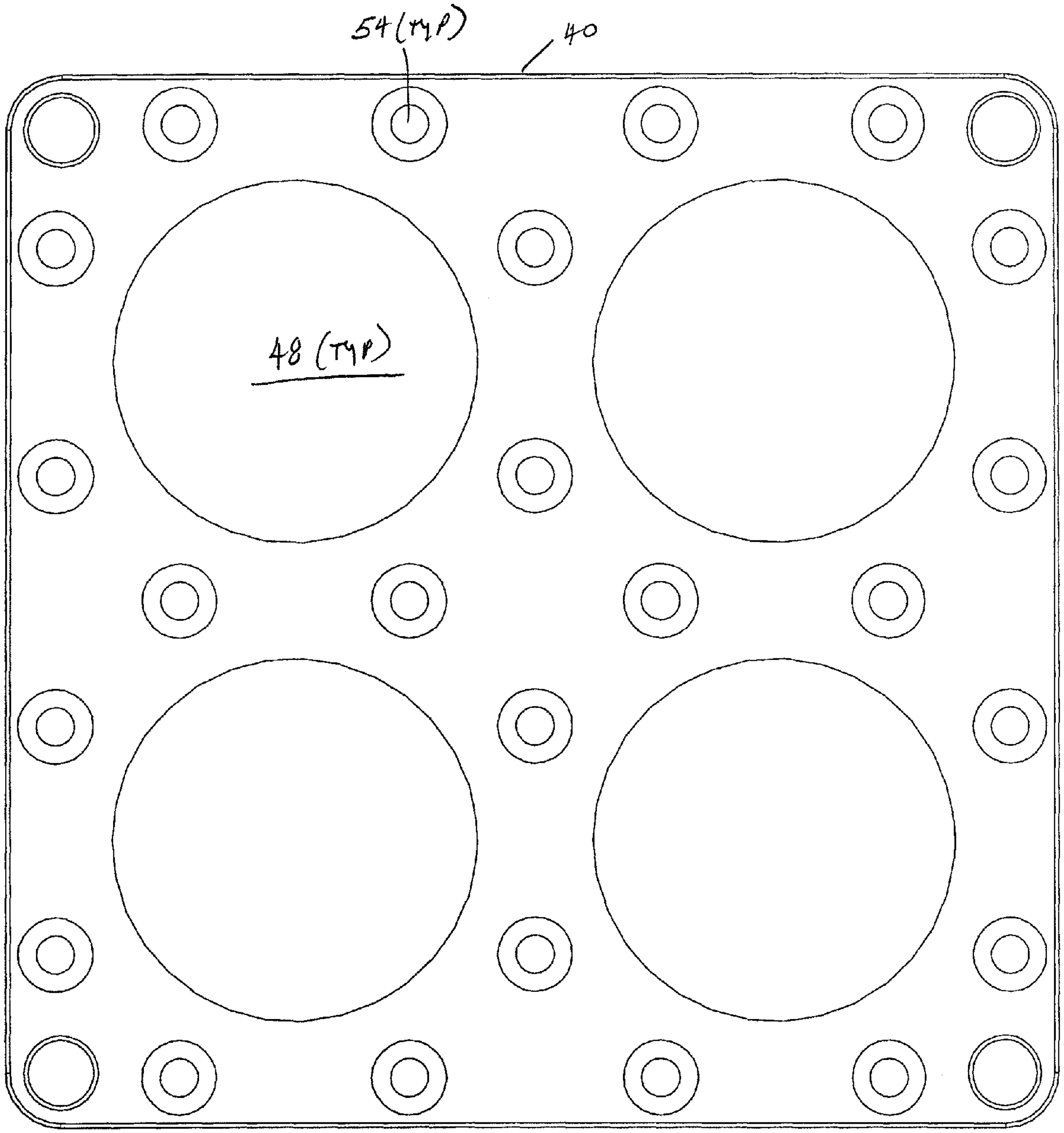
FIG. 5 is a top plan view of the top plate.

As shown in detail in FIGS. 3 and 4, runners 46 for distributing the accelerant to the main apertures 48 are provided. Circular runner grooves 46A surround each of the main apertures 48. Runner segments 46B extend generally tangentially between the sides of the circular runners 46A parallel to a center line extending between the additive inlet ports 42A, 42B. Transverse runner grooves 46C extend perpendicular to the center line extending between the inlet ports 42A, 42B at a position adjacent to the inlet ports and at a medial position. Preferably, the grooves have a width of approximately 0.07 to 0.10 inches and more preferably have a width in the range of 0.090 to 0.098 inches. The grooves preferably have a depth of 0.08 to approximately 0.01 inches with more preferably a depth in the range of 0.088 to 0.092 inches.

According to the invention, in order to avoid head loss as the high pressure accelerant travels through the runners 46, the internal radius corners 52 on the walls defining the groove path all have a radius of at least 0.10 inches and more preferably of at least 0.125 inches. A plurality of injection gates 50 are located around each of the main apertures 48 and extend from the circular runner grooves 46 to the main apertures 48. The injection gates 50 are similar to the injection gates 44 described in U.S. 2009/0188480, which is incorporated herein by reference as if fully set forth. Surprisingly, it was discovered that the high pressure accelerant from the prior device was not being delivered evenly to the throttle bores 16 of the manifold. In order to address this, the present invention provides the additive inlet ports 42A, 42B on opposing sides of the upper plate 40. Further, the increased radius at the intersections of the runner grooves 46A, 46B, 46C results in reduced head loss for more even delivery of the accelerant through the runners 46 to each of the injection gates 50. While injection gates 50 are shown for each of the main apertures 48, fewer or greater numbers of injection gates 50 could be provided.

The upper plate 40 also includes fastener holes 54 aligned in position with the fastener holes 30 of the lower plate and, as shown in FIGS. 1A and 2A, these holes are preferably counter sunk on the upper surface to receive countersunk fasteners for ease of assembly and to avoid interference with the carburetor base. Notches 56 are provided in aligned positions for receiving the fuel injection ports 22A, 22B from the lower plate 20. Additionally, the lower surface of the upper plate 40 around the main apertures 48 includes an intermediate plate recess 58, which surrounds the main apertures 48.

For assembling of the single stage injection plate assembly 10, the intermediate plate 60 is inserted between the lower plate 20 and upper plate 40 with O-rings or gaskets 70 located in the gasket grooves 62, 63 on either side of the intermediate plate 60. The assembly 110 is then connected together via countersunk screws (not shown) being installed from the upper surface of the upper plate 40. The fittings 24 and 44 are then installed for connection to fuel lines and accelerant lines.

Figure 13:
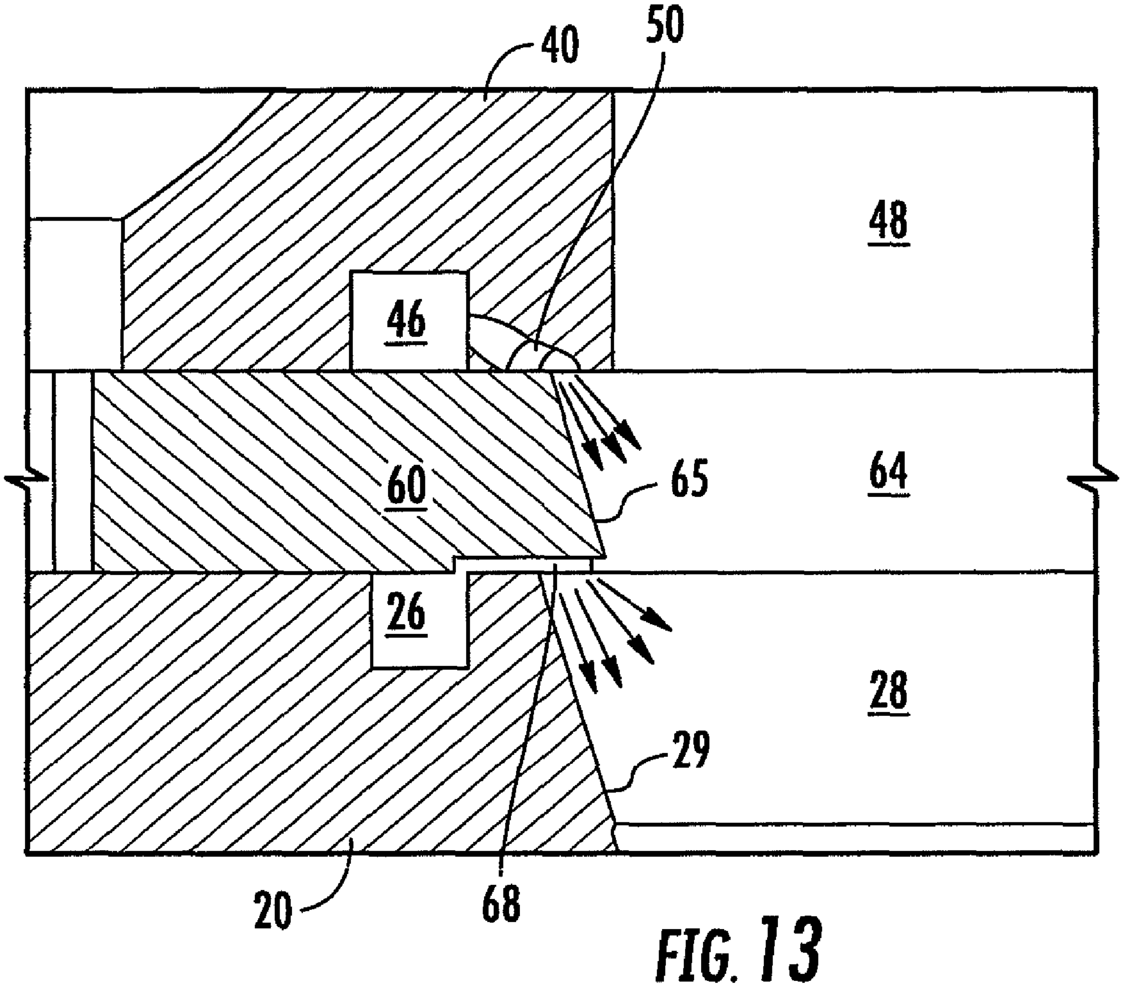
FIG. 13 is a partial cross-sectional view show showing one aligned set of an accelerant injection gate and a fuel injection port.
Figure 14:
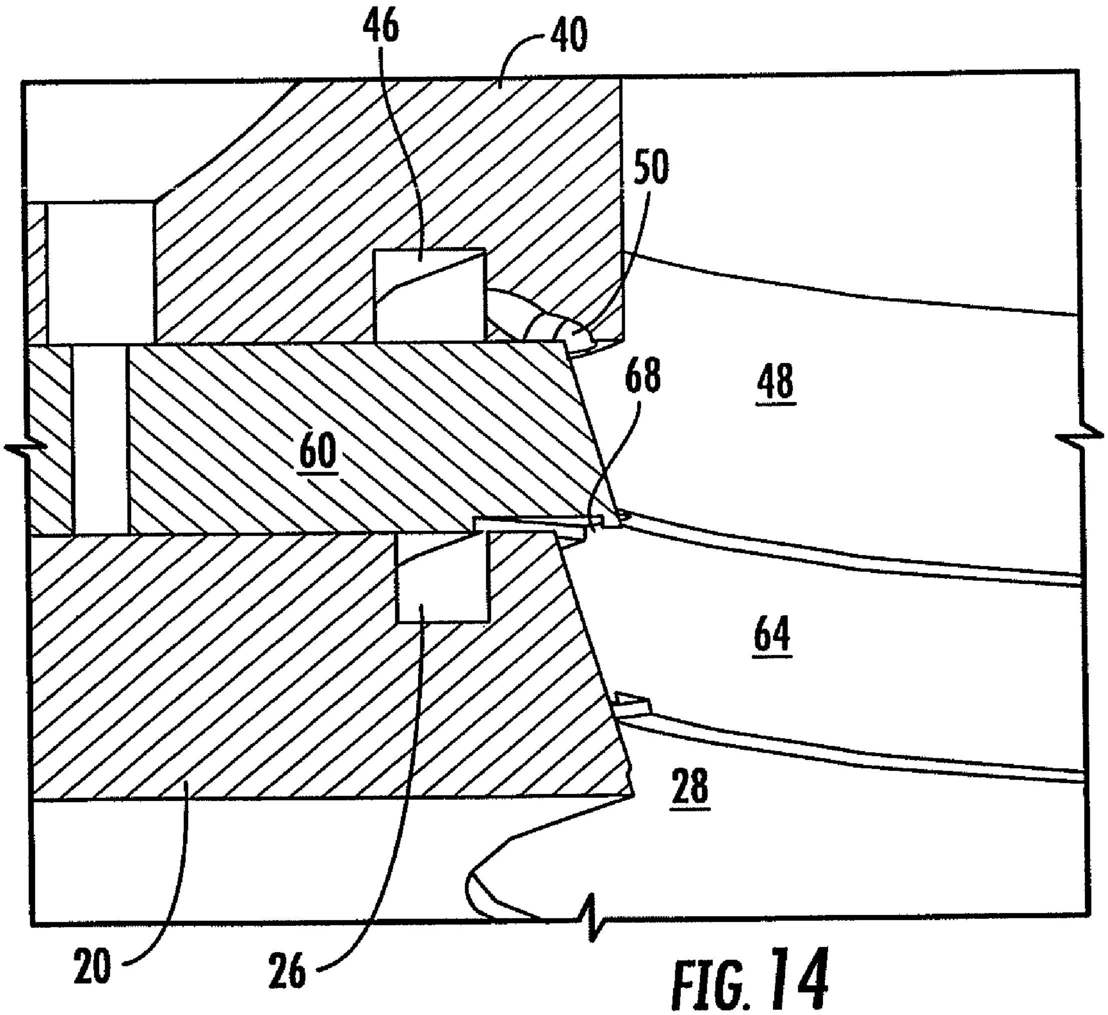
FIG. 14 is a view similar to FIG. 13, in a partial perspective view.

The surface finish of the machined parts is preferably as described in U.S. 2009/0188480 and, depending upon this surface finish, the gaskets 70 are not necessarily required. Referring to FIG. 13, this arrangement provides for pairs of accelerant injection gates 50 located above fuel injection ports 68 distributed around the periphery of the main apertures 28, 48, 64 in order to spray the high pressure accelerant into the fuel delivered by the injection ports 68 down into the throttle bores 16 of the manifold. The high pressure accelerant also creates a venturi effect, drawing additional fuel/air mixture down from the carburetor 12 through the main apertures 28, 48, 64 in the plate assembly 10 and into the throttle bore 16 of the manifold 14. This arrangement can provide increases of 100 to 150 horsepower from the nominal horsepower of an engine.

The accelerant gate geometry is preferably as described in U.S. 2009/0188480 and accordingly is not being repeated here in detail.

The overall height of the plate assembly 10 is preferably about 0.650 inches, with the upper and lower plates 20 and 40 having an overall height of 0.325 inches each. The lower, upper and intermediate plates 20, 40 and 60 are preferably made of machined steel or aluminum, or alloys thereof.

Figure 15:
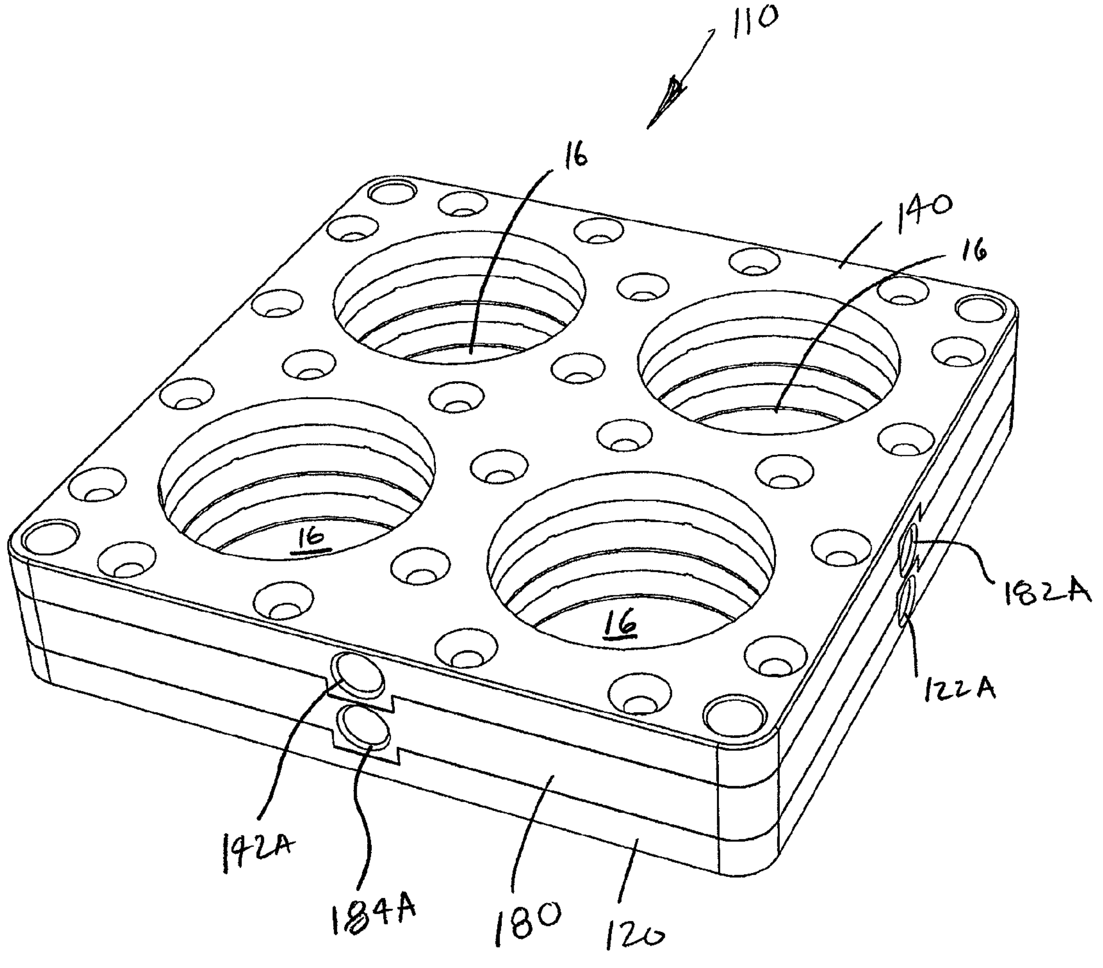
FIG. 15 is a top, front, right perspective view of a dual stage injection plate assembly for injection of primary fuel and an additive or accelerant into the manifold of an internal combustion engine.
Figure 16:
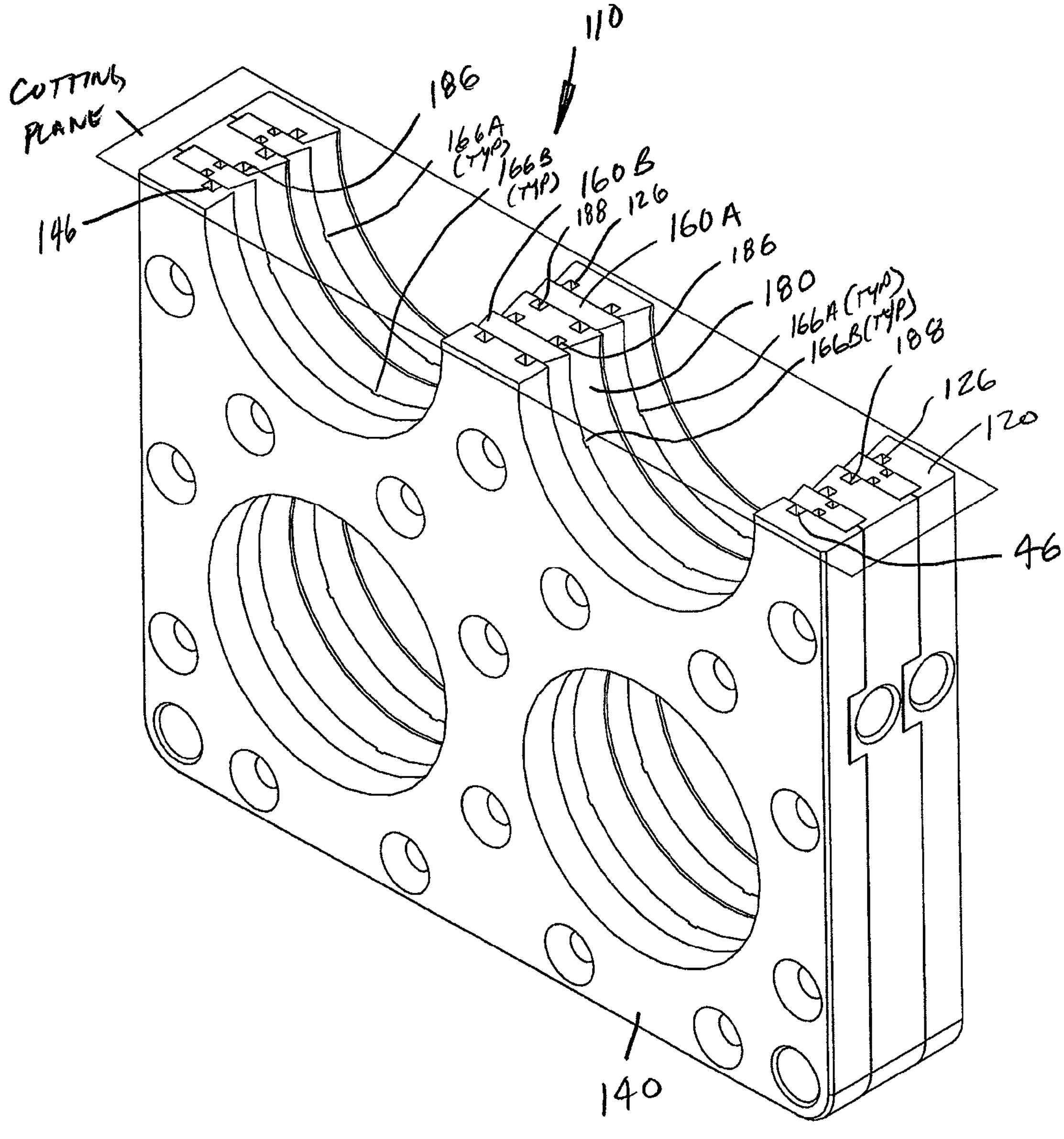
FIG. 16 is a cross-sectional view through the dual stage injection plate assembly of FIG. 15.

Referring now to FIG. 15, a dual stage injection plate assembly 110 is shown. The dual stage injection plate assembly 110 is installed in a similar manner to the injection plate assembly 10 between the carburetor and a manifold of an internal combustion engine. In order to provide additional power to the engine by providing additional accelerant and fuel, the dual stage injection plate assembly 110 provides two sets of accelerant injection gates located generally over respective fuel injection ports spaced around the periphery of each of the main apertures defined through the dual stage injection plate assembly 110. In the preferred embodiment, the upper sets of accelerant injection gates/fuel injection ports are stacked directly above the lower sets of accelerant injection gates and fuel injection ports. However, the upper and lower sets of accelerant injection gate/fuel injection ports could be offset relative to one another in the circumferential direction.

As shown in FIGS. 15, 16, 21A and 21B, the dual stage injection plate assembly 110 includes a lower plate 120, an upper plate 140 and a middle plate 180. Intermediate plates 160A and 160B are located between the lower plate 120 and middle plate 180 as well as between the upper plate 140 and middle plate 180.

In a similar manner to that described above in connection with the single stage injection plate assembly 10, fuel is delivered to the runners supplying the fuel injection ports for each stage via fuel inlet fittings located on opposite sides of the dual stage injection plate assembly. This results in two pairs of fuel inlet ports 122A, 182A; 122B, 182B located on opposite sides of the injection plate assembly 110. Additionally, the additive inlet ports are also located on opposing sides of the injection plate assembly 110 and are stacked on each side in order to supply additives, such as the accelerant nitrous oxide, to each of the stages. This results in stacked additive inlet ports 142A, 184A; 142B, 184B on opposing sides of the injection plate assembly 110. The additive ports are located on adjacent sides to the fuel inlet ports and center lines extending between the opposing additive ports extend generally perpendicularly to center lines extending between the fuel inlet ports. Alternatively, the fuel inlet ports could be located on adjacent sides, and additive inlet ports could be located on adjacent sides, and runners could be defined in the plate assembly to initially direct the fuel to opposite sides and the additive to the other pair of opposite sides for more equal distribution.

Figure 17:
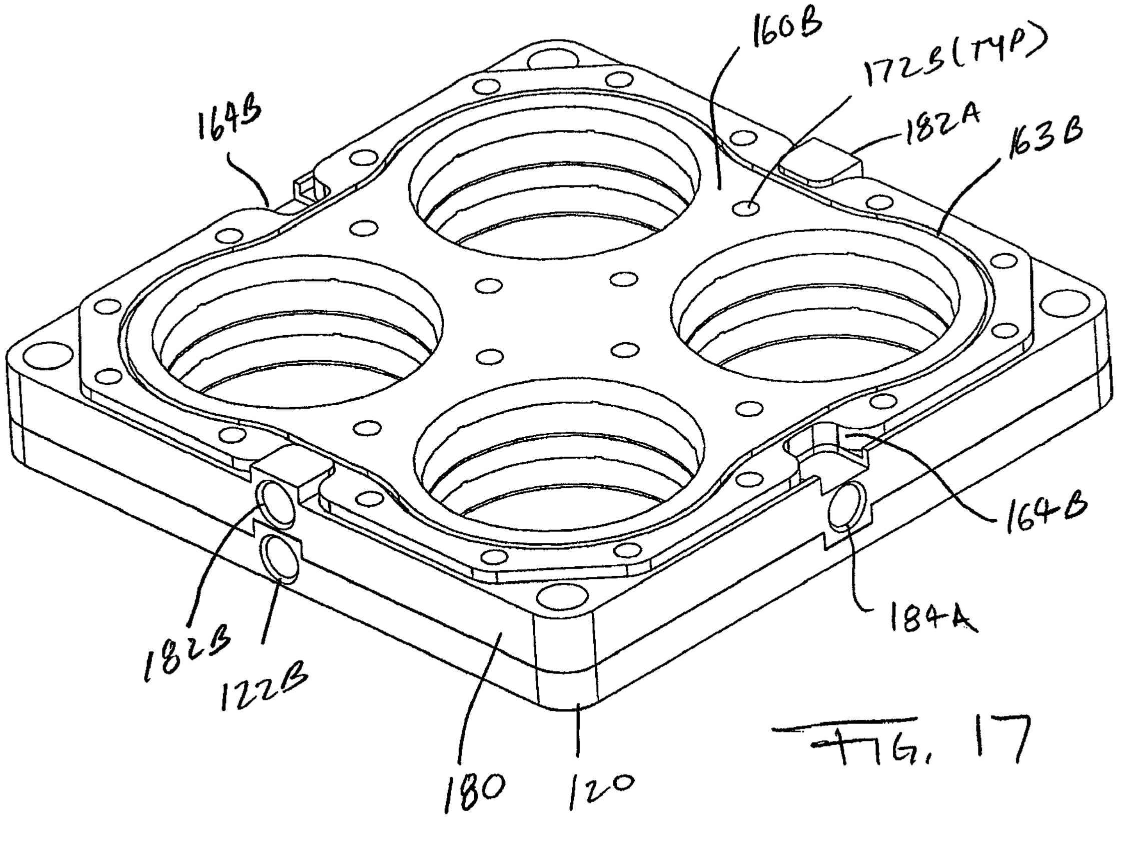
FIG. 17 is a top, front, right perspective view showing the dual stage injection plate assembly of FIG. 15 with the top plate removed.
Figure 18:
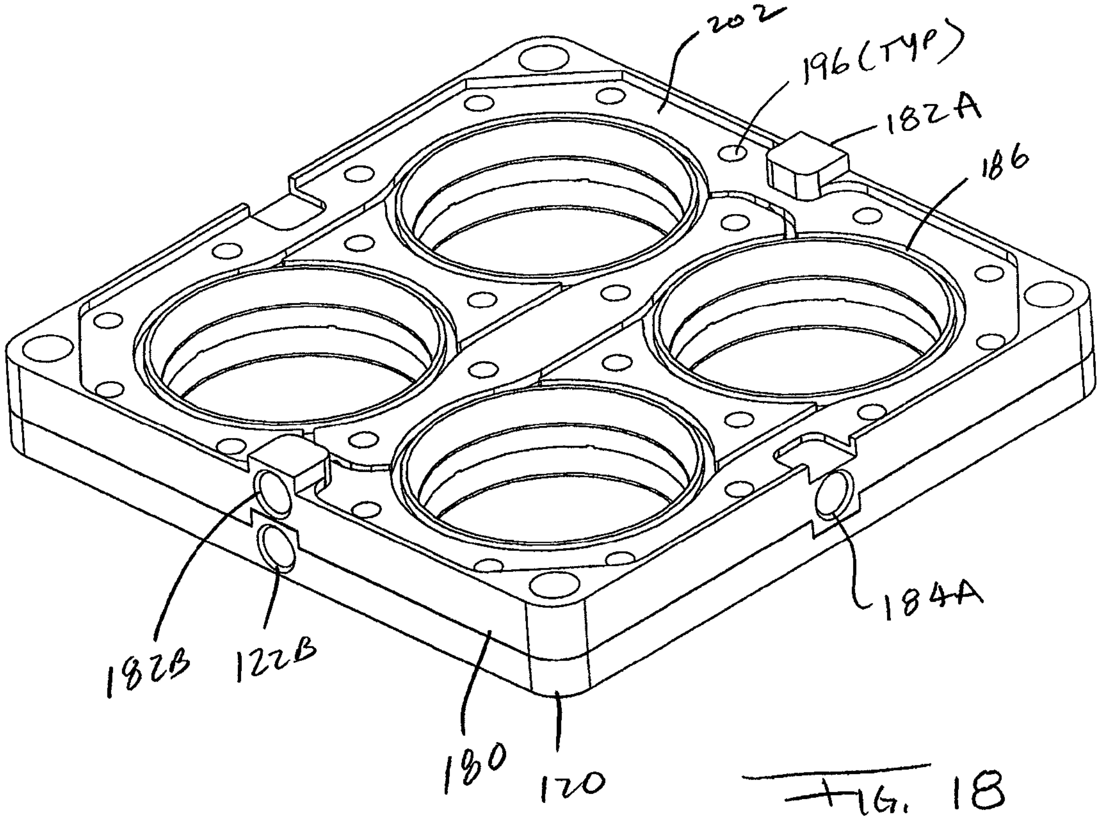
FIG. 18 is a view similar to FIG. 17 showing the assembly with the top and second intermediate plates removed.

FIG. 17 shows the injection plate assembly 110 with the upper plate 140 removed and the fuel inlet ports 182A, 182B on the middle plate 180 clearly visible. FIG. 18 shows the injection plate assembly 110 with the upper plate 140 and the second intermediate plate 160B removed so that the fuel runners 186 on the upper surface of the middle plate 180 are visible.

Figure 19:
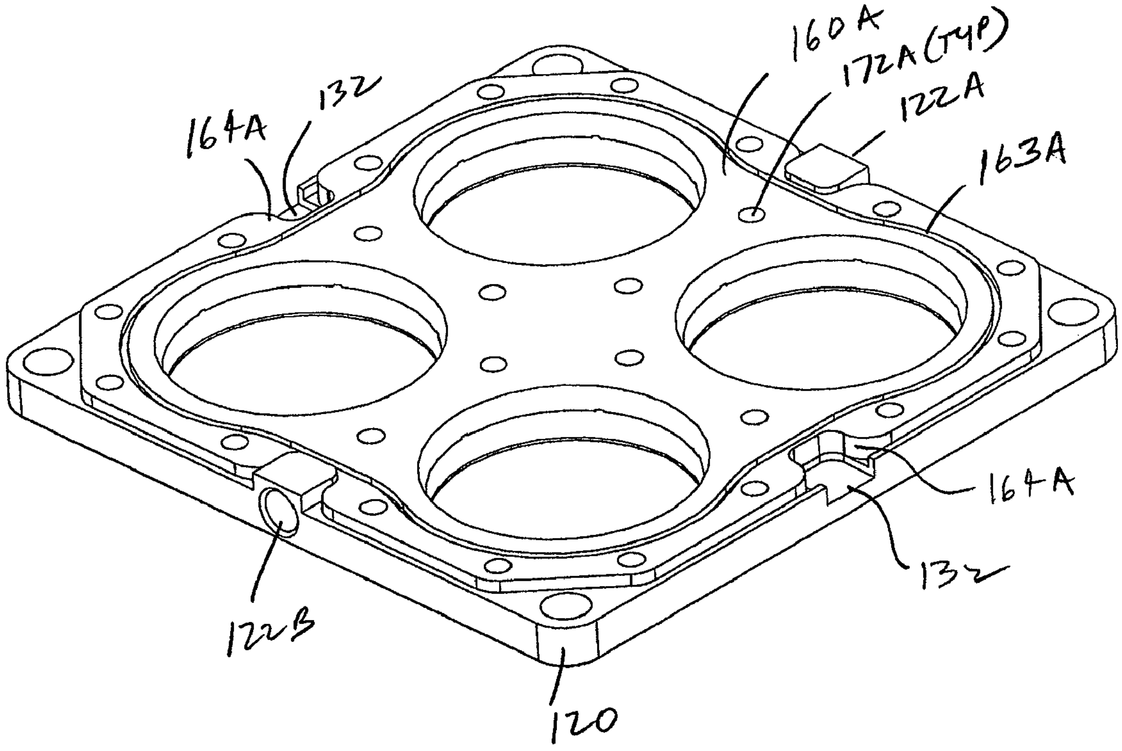
FIG. 19 is a view similar to FIG. 18 with the middle plate removed.
Figure 20:
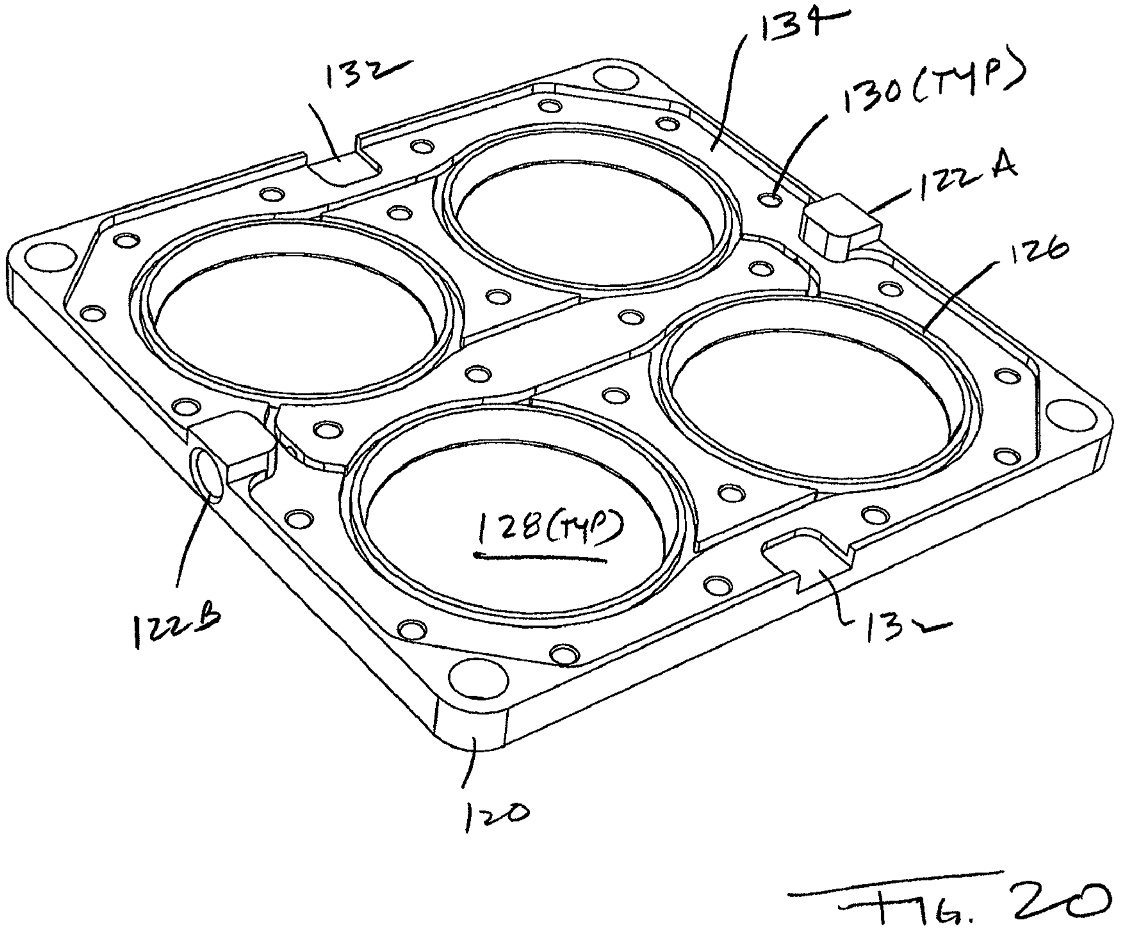
FIG. 20 is a view similar to FIG. 19 with only the bottom plate being shown.

FIG. 19 shows the injection plate assembly 110 with the middle plate 180 removed so that the first intermediate plate 160A is clearly shown along with the lower fuel inlets 122A, 122B in the lower plate 120. FIG. 20 shows the lower plate 120 with the fuel runners 126 of the lower stage clearly visible.

Figure 21A:
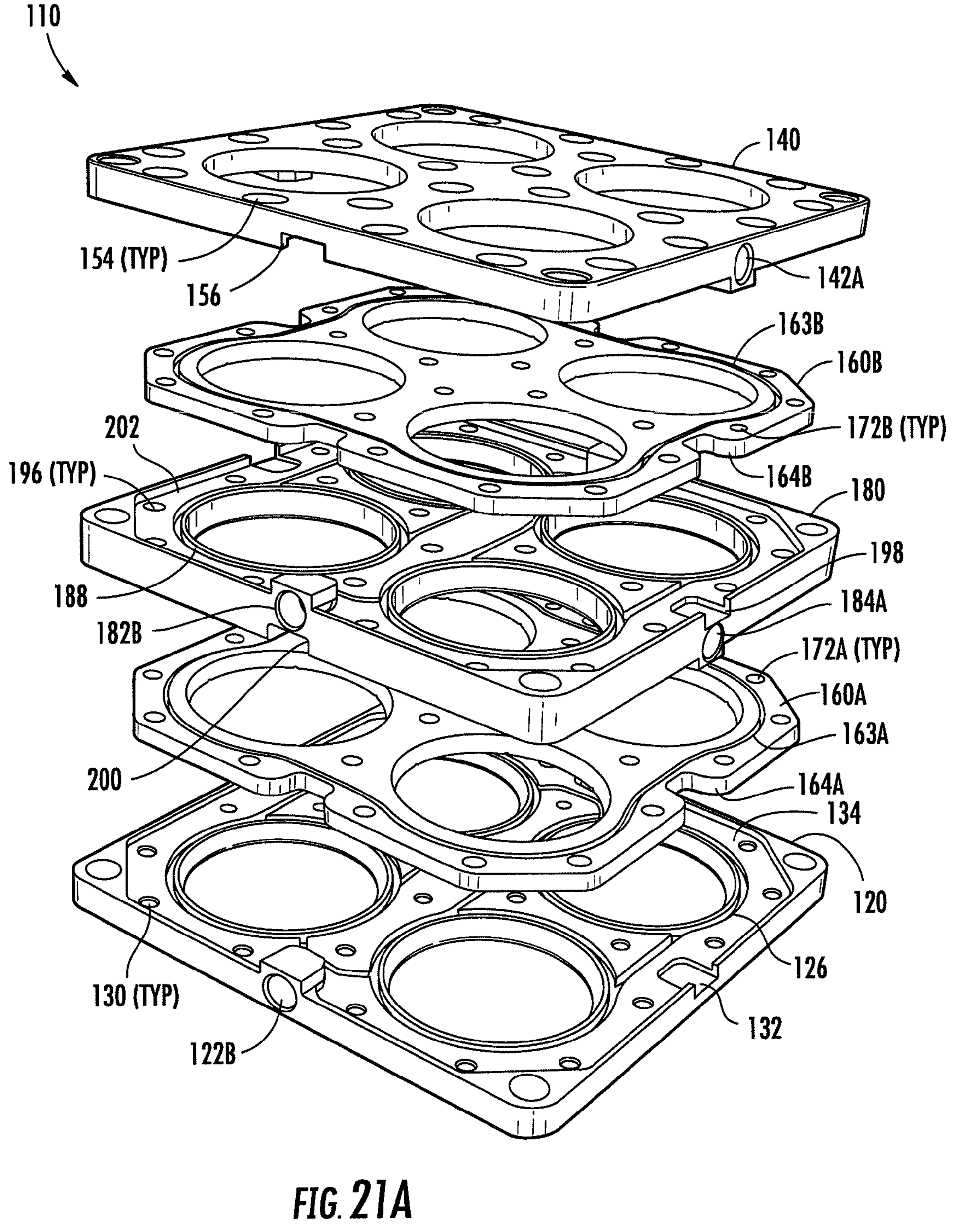
FIG. 21A is an exploded top, front, right perspective view of the dual stage injection plate assembly of FIG. 15.
Figure 21B:
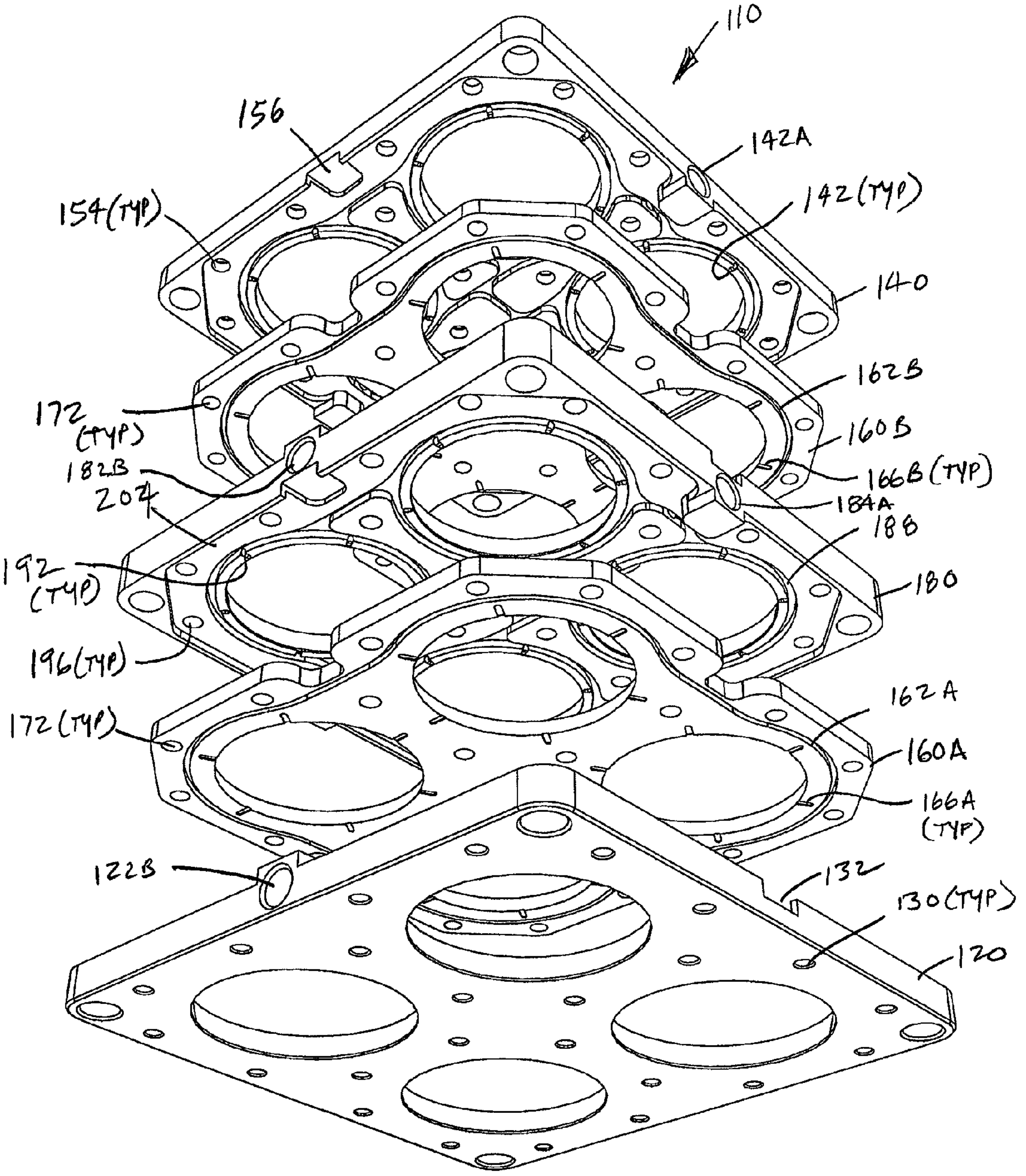
FIG. 21B is an exploded bottom, front, right perspective view of the dual stage injection plate assembly of FIG. 15.

Referring to FIGS. 21A and 21B, exploded assembly views are provided for the injection plate assembly 110 showing the arrangement of the lower plate 120, first intermediate plate 160A, middle plate 180, second intermediate plate 160B and upper plate 140. O-ring gaskets are preferably located on each side of the intermediate plates 160A, 160B in the gasket grooves provided in a similar manner to the O-ring gaskets 70 described in connection with the single stage injection plate assembly 10.

Figure 22:
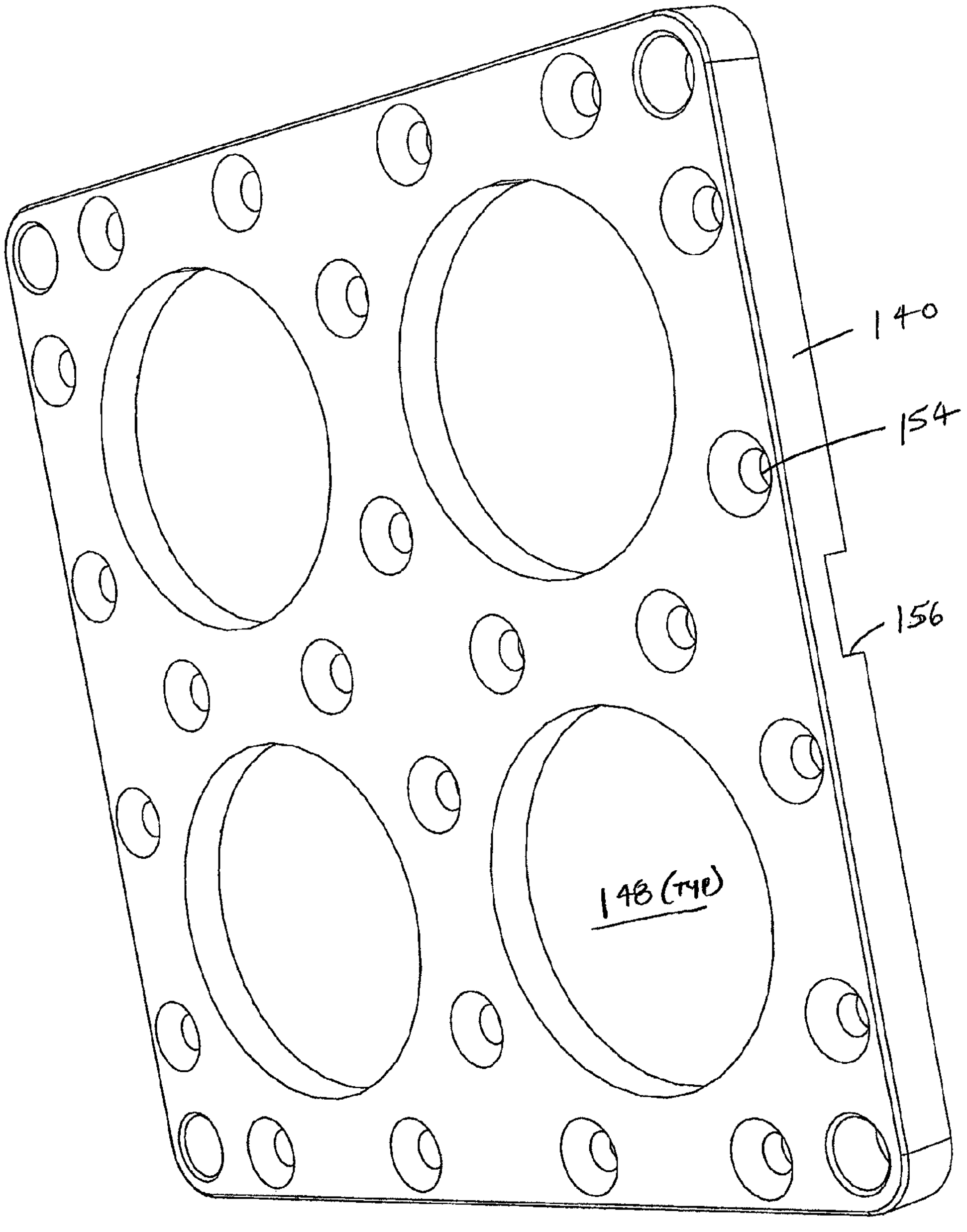
FIG. 22 is a perspective view of the top plate taken from the top surface.
Figure 23:
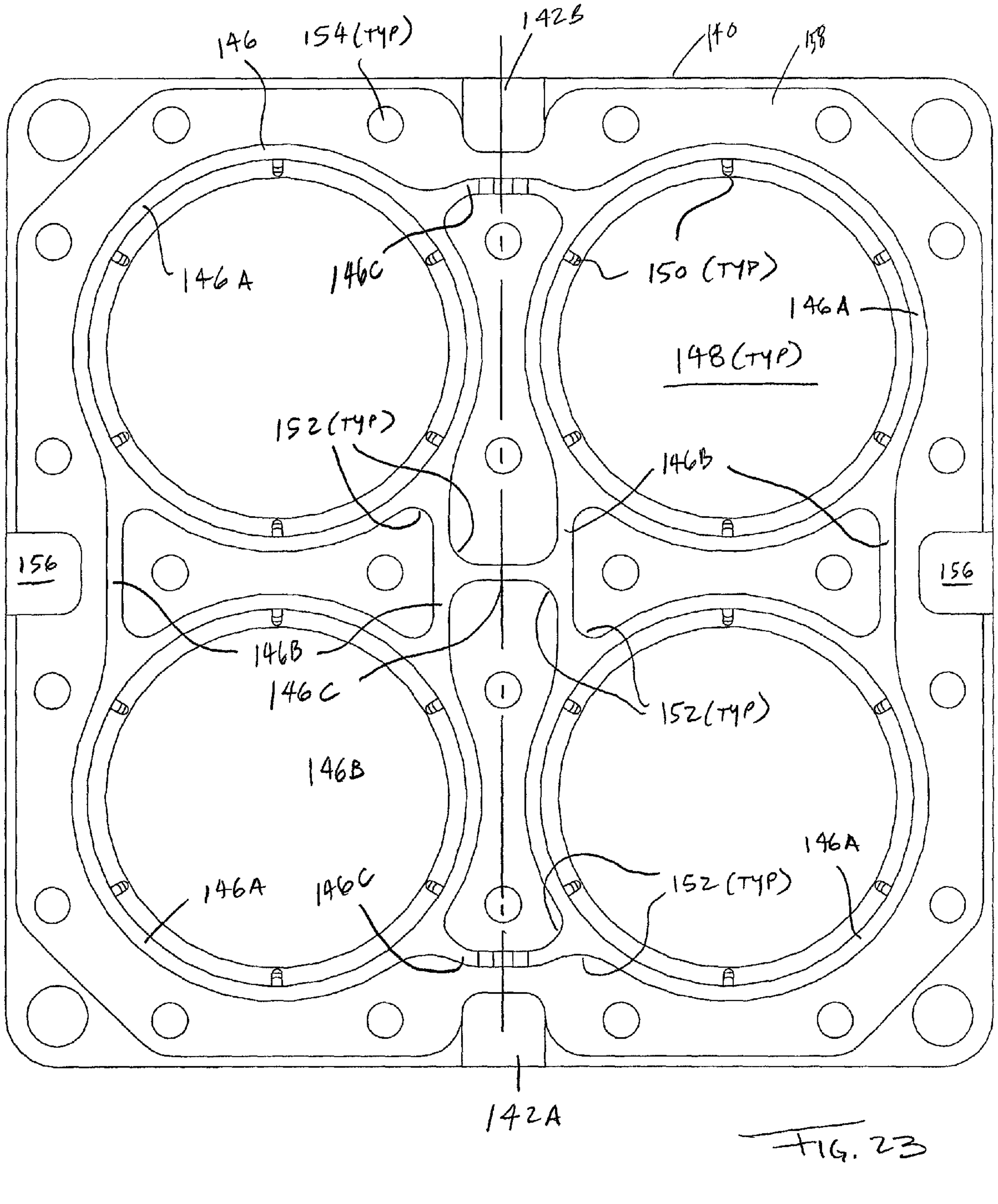
FIG. 23 is a bottom plan view of the top plate.

Referring to FIGS. 22 and 23, the upper plate is shown in detail with the additive inlet ports 142A, 142B as well as the runners 146 for the additive, which is preferably an accelerant such as nitrous oxide. The arrangement of the upper plate 140 is similar to the arrangement of the upper plate 40 in connection with the first embodiment and similar items have been designated with the same reference numerals plus 100. The circular runner grooves 146A extend around the main apertures 148 and runner groove segments 146B extend generally tangentially between the circular runner grooves 146A in a direction parallel to a center line extending between the additive inlet ports 142A, 142B. Transverse runner groove segments 146C extend adjacent to the additive inlet ports 142A, 142B to the adjacent circular runner grooves 146A and also extend between the two center segments 146B at a generally medial position. All the internal radius corners 152 along the paths defined by the runner grooves 146 preferably have a radius of at least 0.10 inches and more preferably have a radius of at least 0.125 inches in order to reduce head loss. Injection gates 150 are defined around the periphery of each of the main apertures 148 and extend from the circular grooves 146A into the main apertures 148. The injection gates 50 have generally the same geometry as the injection gates 50. The fastener holes 154 are also provided for assembling the dual stage injection plate assembly 110. As shown in FIG. 22, these fastener holes are preferably counter sunk on the top side of the upper plate 140. Notches 156 are also provided on the upper plate 140 on adjacent sides to the inlet ports 142A, 142B which receive the fuel ports of the adjacent plate middle plate 180. The lower surface of the upper plate 140 also includes a recess 158 which surrounds the main apertures 148 and is designed to receive the upper intermediate plate 160B.

Figure 24:
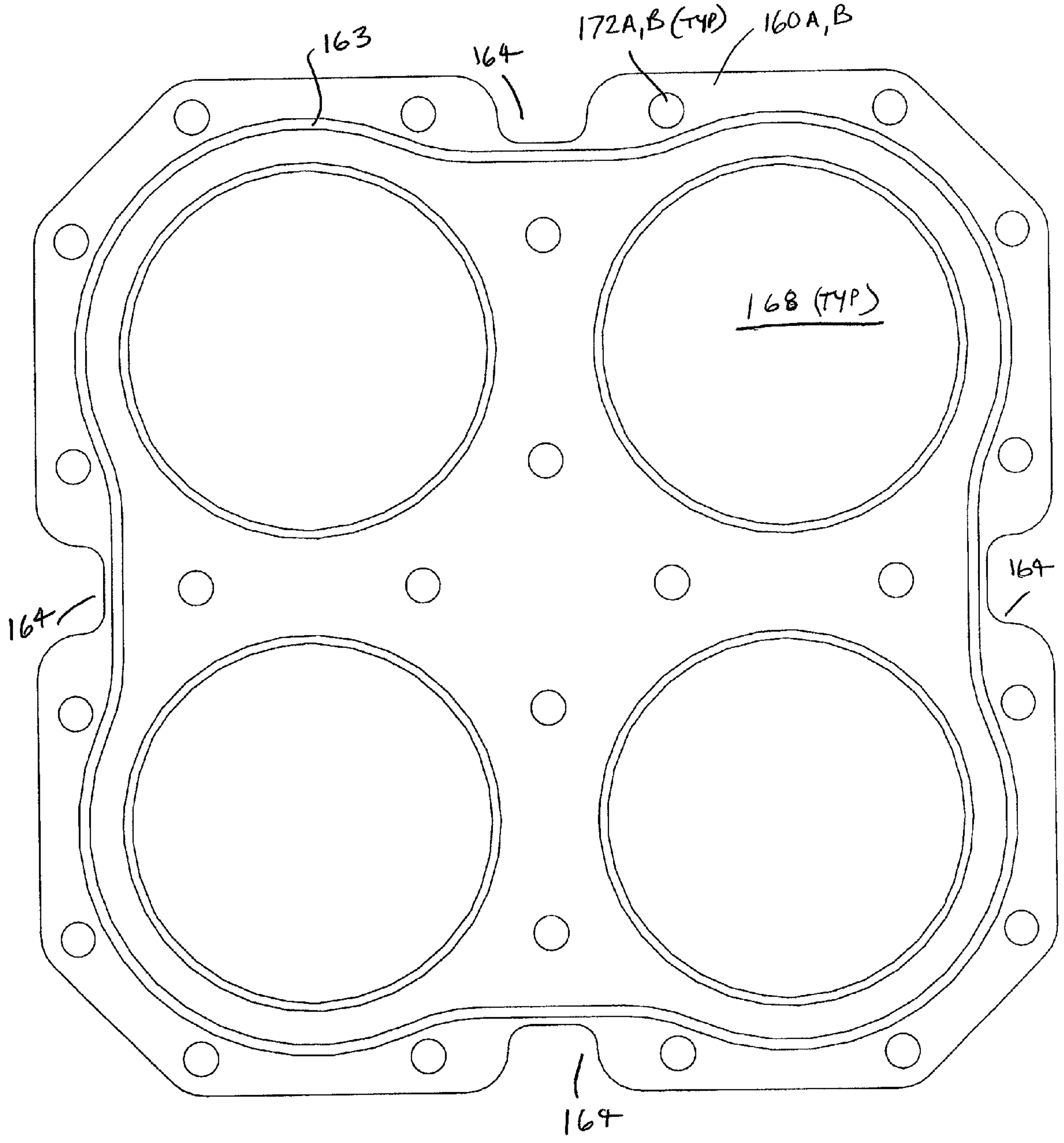
FIG. 24 is a top plan view of an intermediate plate.
Figure 25:
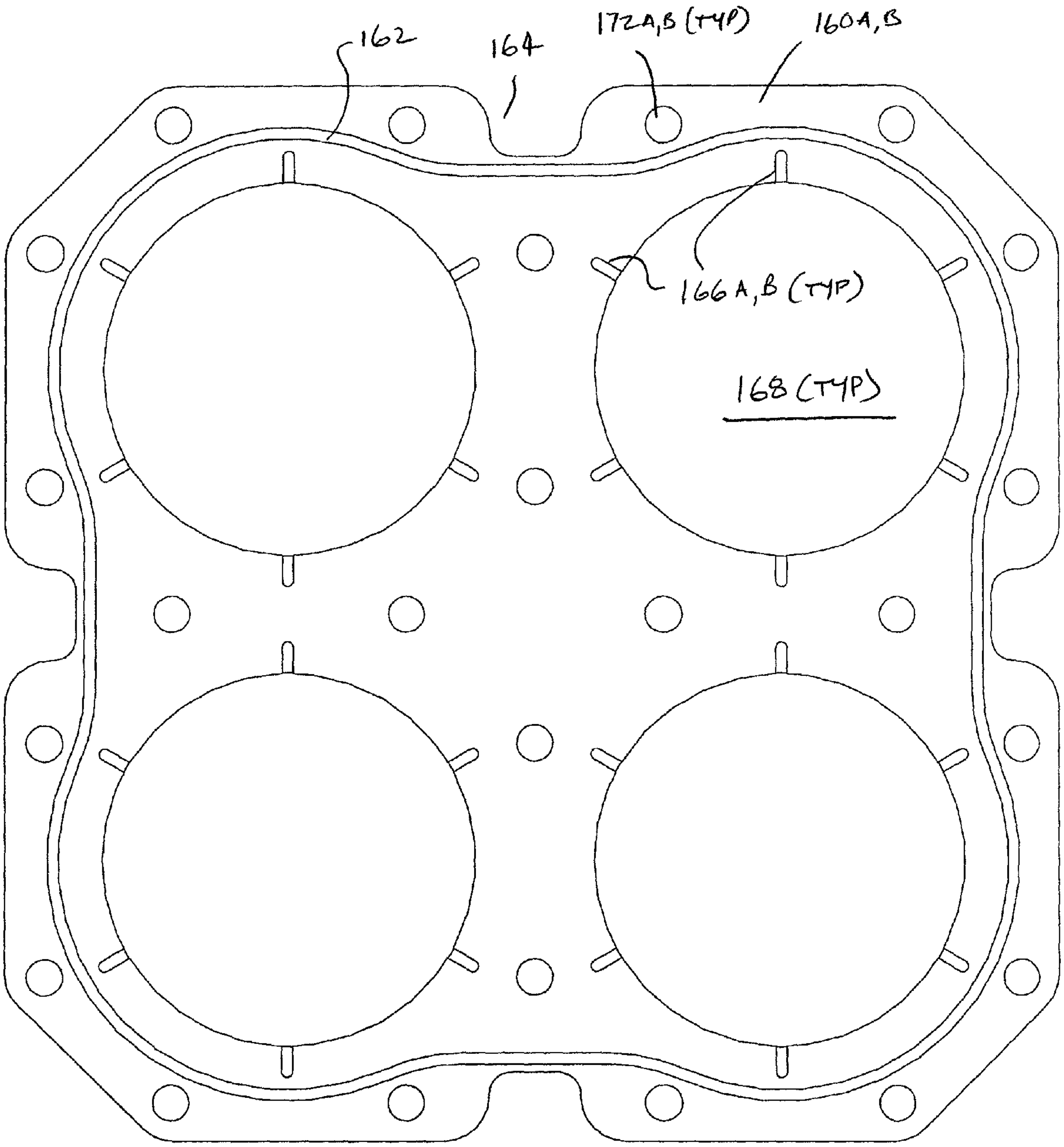
FIG. 25 is a bottom plan view of the intermediate plate.
Figure 26:
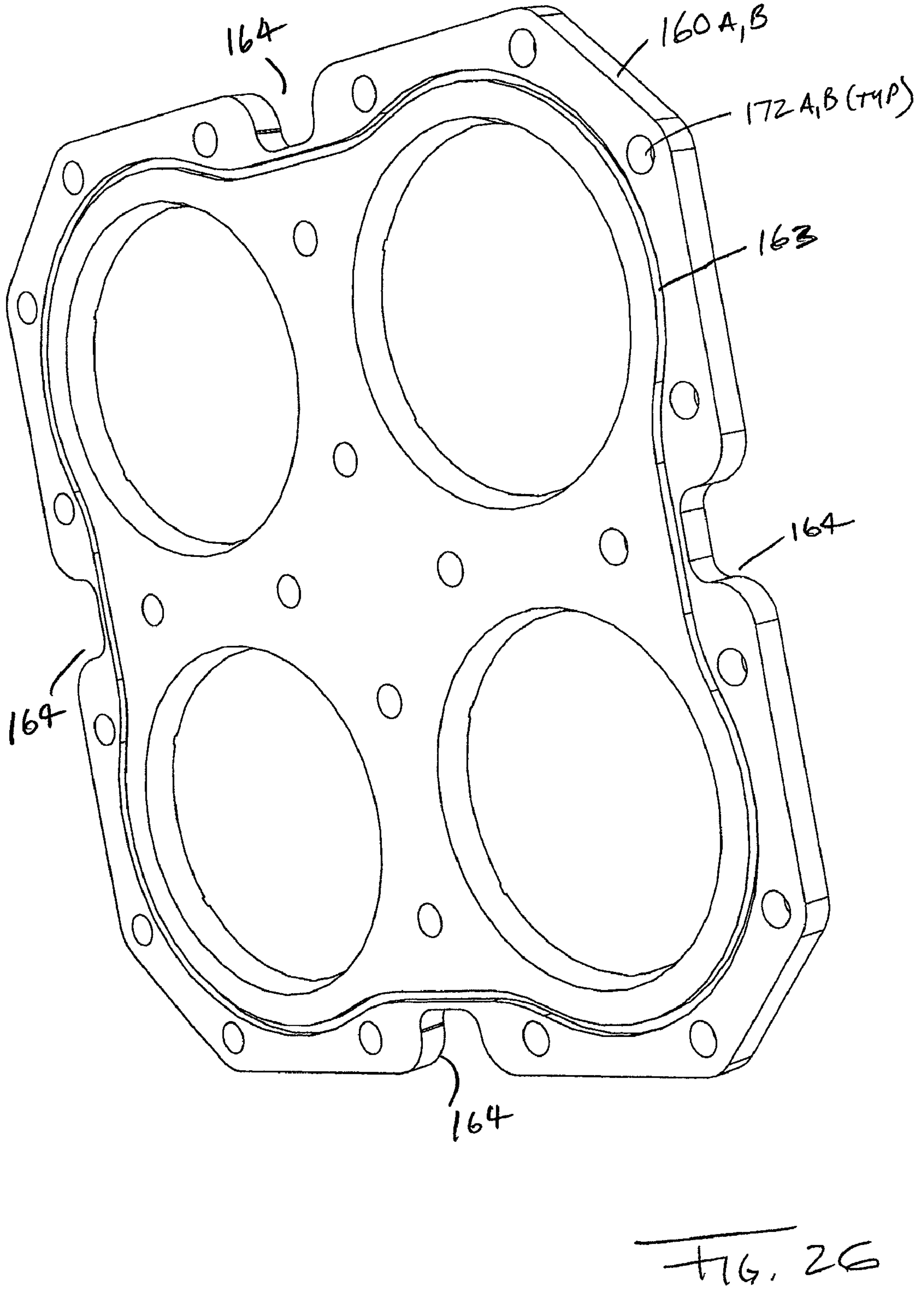
FIG. 26 is a perspective view of the intermediate plate.

Referring to FIGS. 24 and 25, the intermediate plates 160A, 160B are shown. The intermediate plates 160A, 160B are generally the same as the intermediate plate 60 described in connection with the first embodiment of the injection plate 10. The upper surface shown in FIG. 24 includes the gasket groove 163. The main apertures 168 as well as the fastening holes 172 are also shown. FIG. 25 shows the fuel injection ports 166 located around the periphery of each of the main apertures 168 on the lower surface of the intermediate plate 160A, 160B. These fuel injection ports 166 open into the main apertures 168 and provide a fluid connection to the circular fuel runners in the adjacent plates 120, 180. FIG. 26 shows a perspective view of the intermediate plates 160A, 160B where the side notches 164 that provide clearance for both the fuel inlet ports and the additive inlet ports are clearly illustrated.

Figure 27:
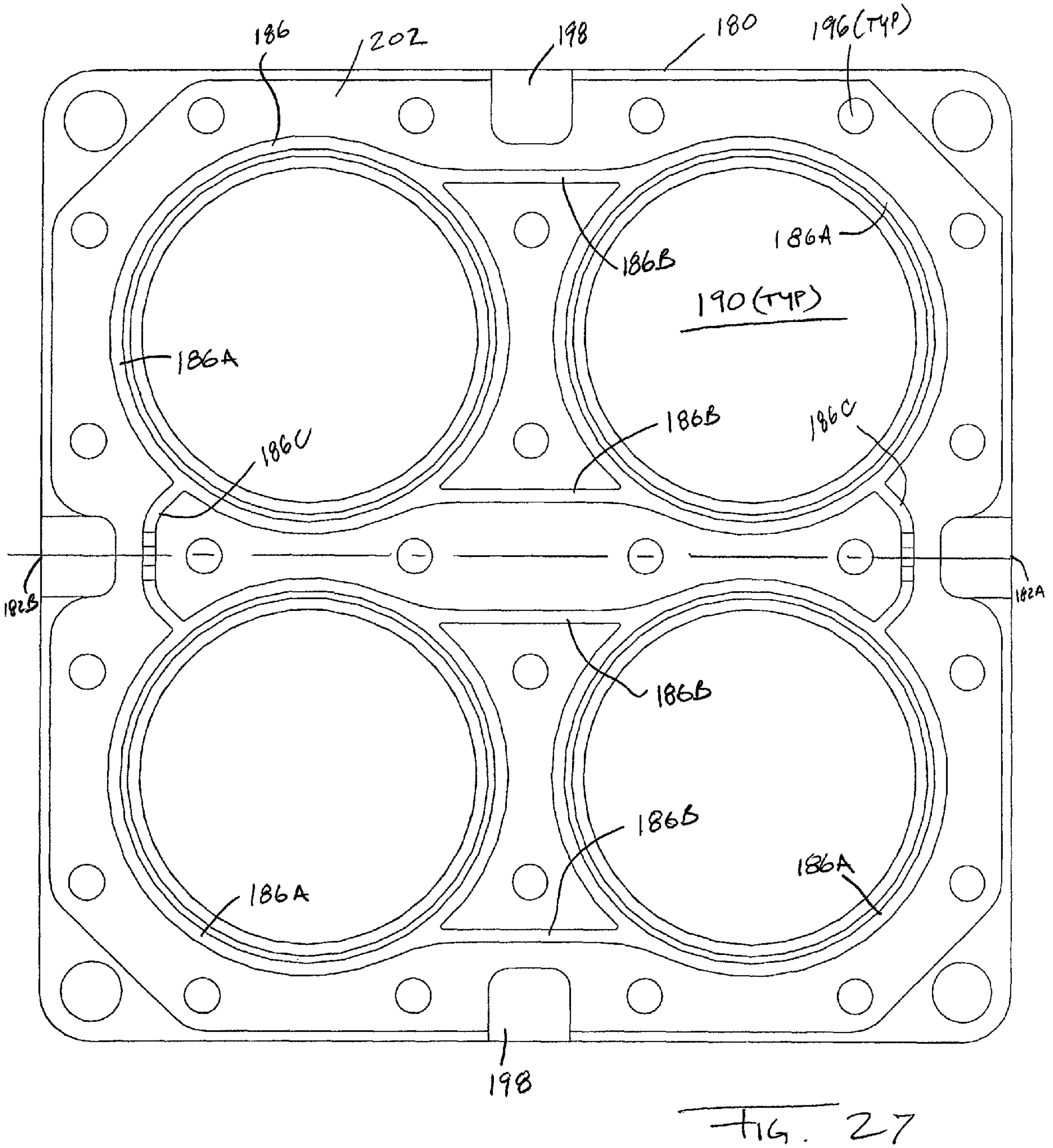
FIG. 27 is a top plan view of the middle plate.
Figure 28:
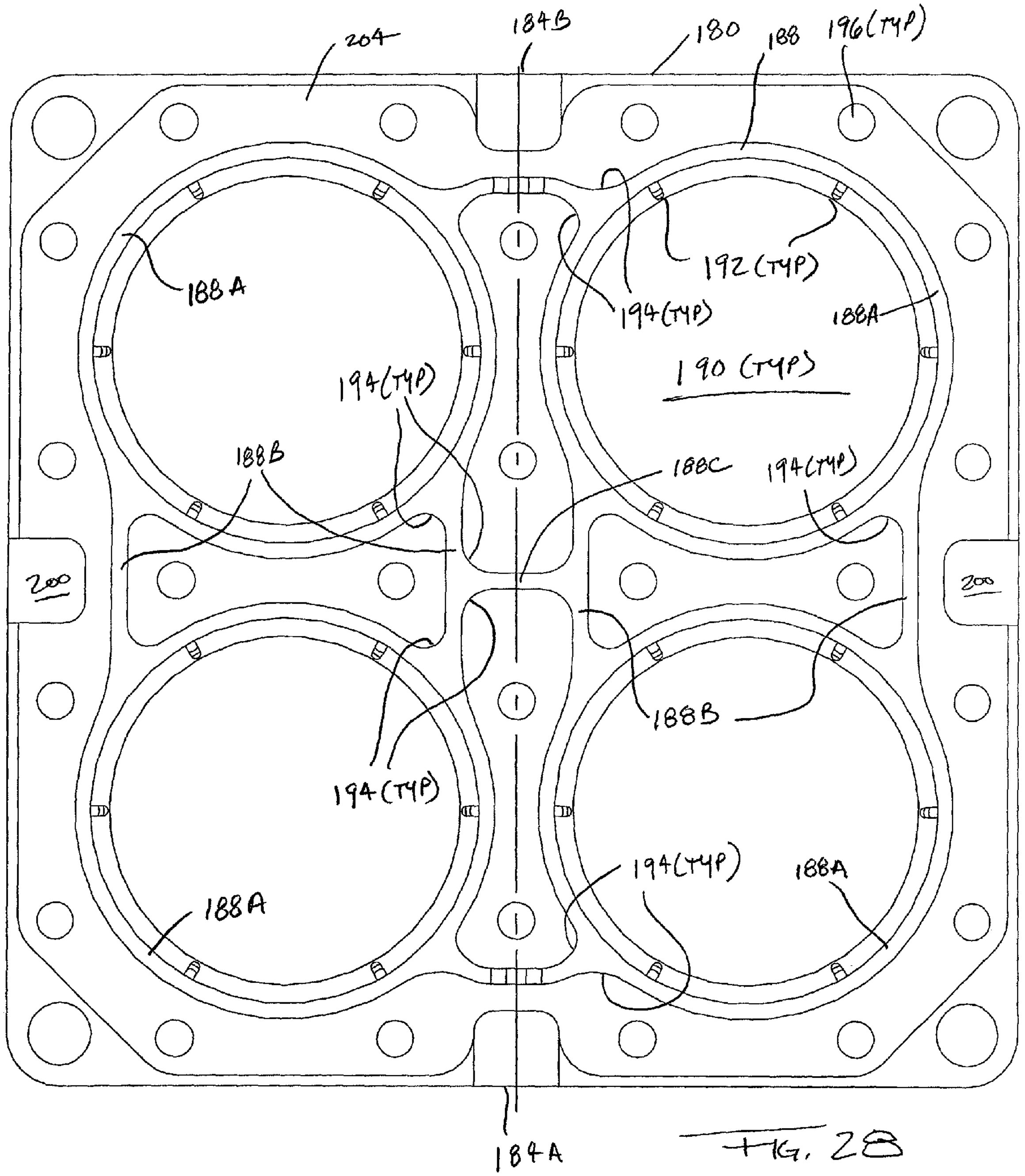
FIG. 28 is a bottom plan view of the middle plate.

FIGS. 27 and 28 show the middle plate 180 in detail. In FIG. 27, the upper surface of the middle plate 180 is shown with the fuel ports 182A, 182B located on opposite sides. Notches 198 are provided on the adjacent sides to receive the additive ports 142A, 142B from the adjacent upper plate 140. Runners 186 are shown for providing fuel to the fuel ports defined in the adjacent surface of the adjacent intermediate plate 160B. The runners 186 include the circular runner grooves 186A which surround each of the main apertures 190 as well as transverse runner segment grooves 186B which extend parallel to a center line extending between the fuel inlet ports 182A, 182B to connect the adjacent circular runners 186A in a generally tangentially manner. Transverse runner segment grooves 186C extend perpendicular to the center line extending between the fuel inlet ports 182A, 182B adjacent to the fuel inlet ports 182A, 182B in order to carry fuel to the adjacent circular runners 186A. The size and depth of the runners is generally the same as the fuel runners 26 described above in connection with the first embodiment of the invention. Fastener holes 196 are also defined through the middle plate 180 and the upper surface includes a top recess 202 in order to receive the upper intermediate plate 160B.

Referring to FIG. 28, the lower surface of the middle plate 180 is shown in detail, and includes the additive ports 184A, 184B for supplying an accelerant such as nitrous oxide to the lower stage of the dual stage injection plate assembly 110. The additive ports 184 are connected to runners 188 which include circular runner grooves 188A which extend around the main apertures 190 and are connected via runner segment grooves 188B which extend parallel to a center line connecting the additive inlet ports 184A, 184B in a generally tangential manner. Transverse runner segments 188C extend between the circular runners 188A adjacent to the additive inlet ports 184A, 184B as well as a medial position between the runner segments 188B. Injection gates 192 are located around each of the main apertures 190 and connect the circular runners 188A to the main apertures 190 in order to provide accelerate. The injection gates 192 are as described above in connection with the injection gates 50 of the first embodiment. A bottom recess 204 surrounds the main apertures 190 in order to receive the lower intermediate plate 160A. Notches 200 are provided on adjacent sides to the sides with the fuel injection ports 182A, 182B in order to receive the fuel inlet ports 122A, 122B from the lower plate 120 at assembly. The internal radius corners 194 are similar to the internal radius corners 152 described above and the internal radius corners 52 of the first embodiment 10 in that they have a radius of at least 0.10 inches and more preferably a radius of at least 0.125 inches. The size of the runners 188 is the same as described in connection with the runners 146 of the upper plate 140.

Figure 29:
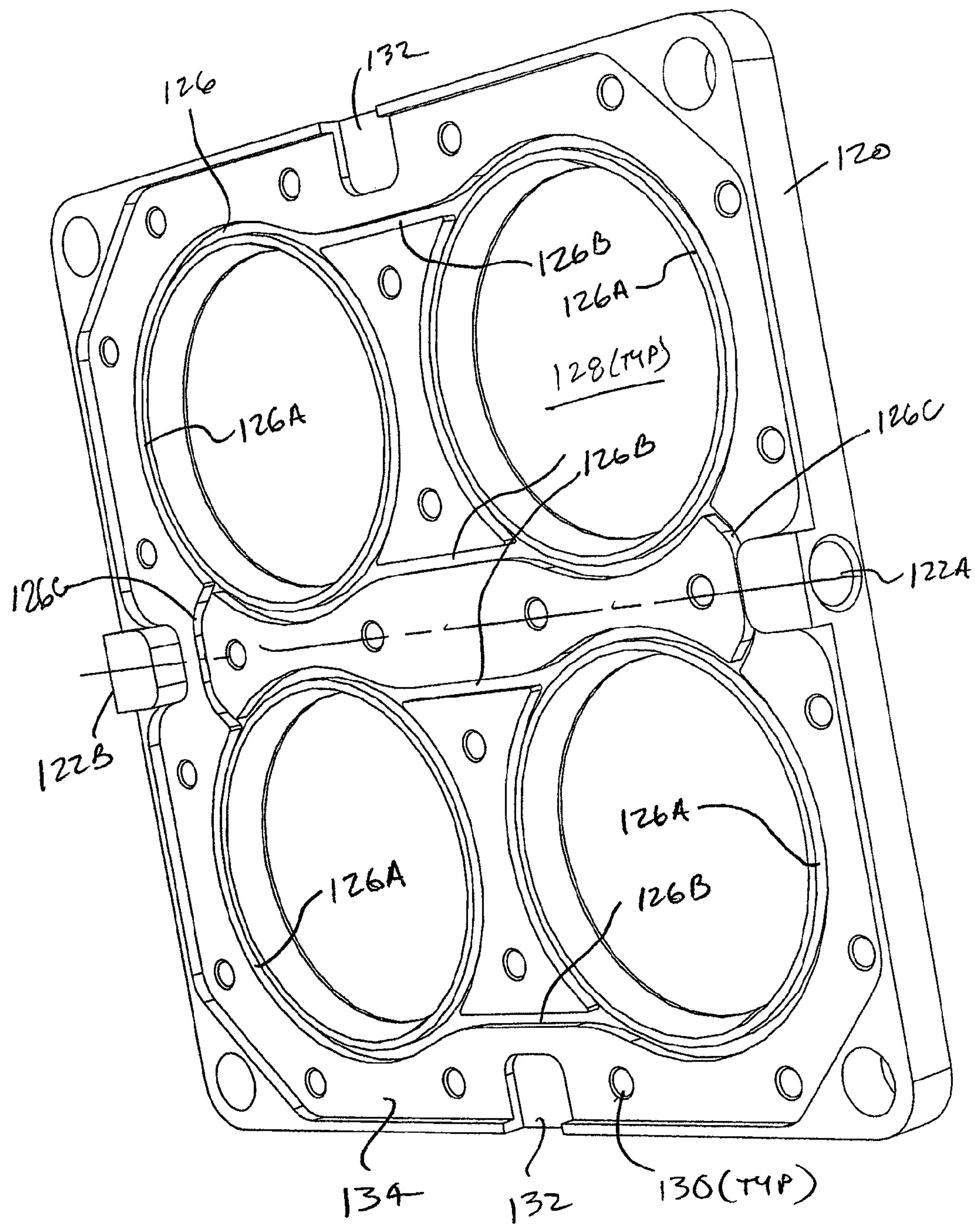
FIG. 29 is a top perspective view of the bottom plate.

Referring to FIG. 29, the lower plate 120 is shown in detail. The lower plate 120 is the same as the lower plate 20 of the first embodiment and like elements have been indicated with like reference numbers plus 100. The fuel inlet ports 122A, 122B are shown on opposing sides of the lower plate 120. Notches 132 are on the adjacent sides in order to receive the additive inlet ports 184 of the middle plate. Runners 126 are provided for the fuel and include the circular runner grooves 126A which extend around the main apertures 128, and runner segments 126B which extend parallel to a center line extending between the fuel inlet ports 122A, 122B, generally tangentially to the circular runner grooves 126A. Transverse runner segments 126C are located adjacent to the fuel inlet ports 122A, 122B and extend transverse to the center line between the fuel inlet ports in order to connect to the adjacent circular runners 126A, 126B. The size of the runners 126 is the same as the size of the runners 26 noted above.

The dual stage injection plate assembly 110 provides additional power boost by providing stacked pairs of accelerant injection gates and fuel inlet ports to provide more fuel and accelerant to an internal combustion engine. The stages can be sequentially actuated based on the fuel and accelerant only being initially supplied to the lower stage and, once a certain power has developed by the engine, the additional stage is turned on for a further power boost.

Referring now to FIGS. 30-39, a single stage injection plate assembly 210, which is similar to the injection plate assembly 10 described above is shown. Similar elements have been indicated with the same reference numbers +200. For example the lower plate 220 of this embodiment is similar to the lower plate 20 of the single stage injection plate assembly 10. Here, the lower plate 220 has fuel inlet ports 222A and 222B located on adjacent sides. Preferably connection fittings are threaded into the fuel inlet ports 222A, 222B. As shown most clearly in FIGS. 31 and 34, the lower plate 220 includes runners 226A, B, C that extend from the inlet ports 222A and 222B to deliver fuel to opposite sides of the main aperture 228, which is aligned with the single throttle bore of the carburetor and manifold (not shown). The preferred bore size is presently 95 mm or 110 mm in diameter. The main aperture 228 includes tapered sidewalls, shown in detail in FIG. 39. The runners 226 includes a generally circular groove 226A defined around the main aperture 228 and runner segments 226B and 226C that lead from the fuel inlet ports 222A, 222B to diametrically opposed positions on opposite sides of the main aperture 228. The runner segment 226B extends from the first fuel inlet port 222A partially around the main aperture 228 to reach the side opposite to the runner segment 226C that extends form the second fuel inlet port 222B. The runner grooves have a width of approximately 0.07 to 0.09 inches and, most preferably have a width in the range of approximately 0.076 to approximately 0.080. The grooves preferably have a depth of approximately 0.08 to approximately 0.10 inches and more preferably have a depth in the range of approximately 0.09 inches. Internal corner radii defining the boundaries of the groove paths and at intersections preferably having a radius of 0.016 inches.

Figure 34:
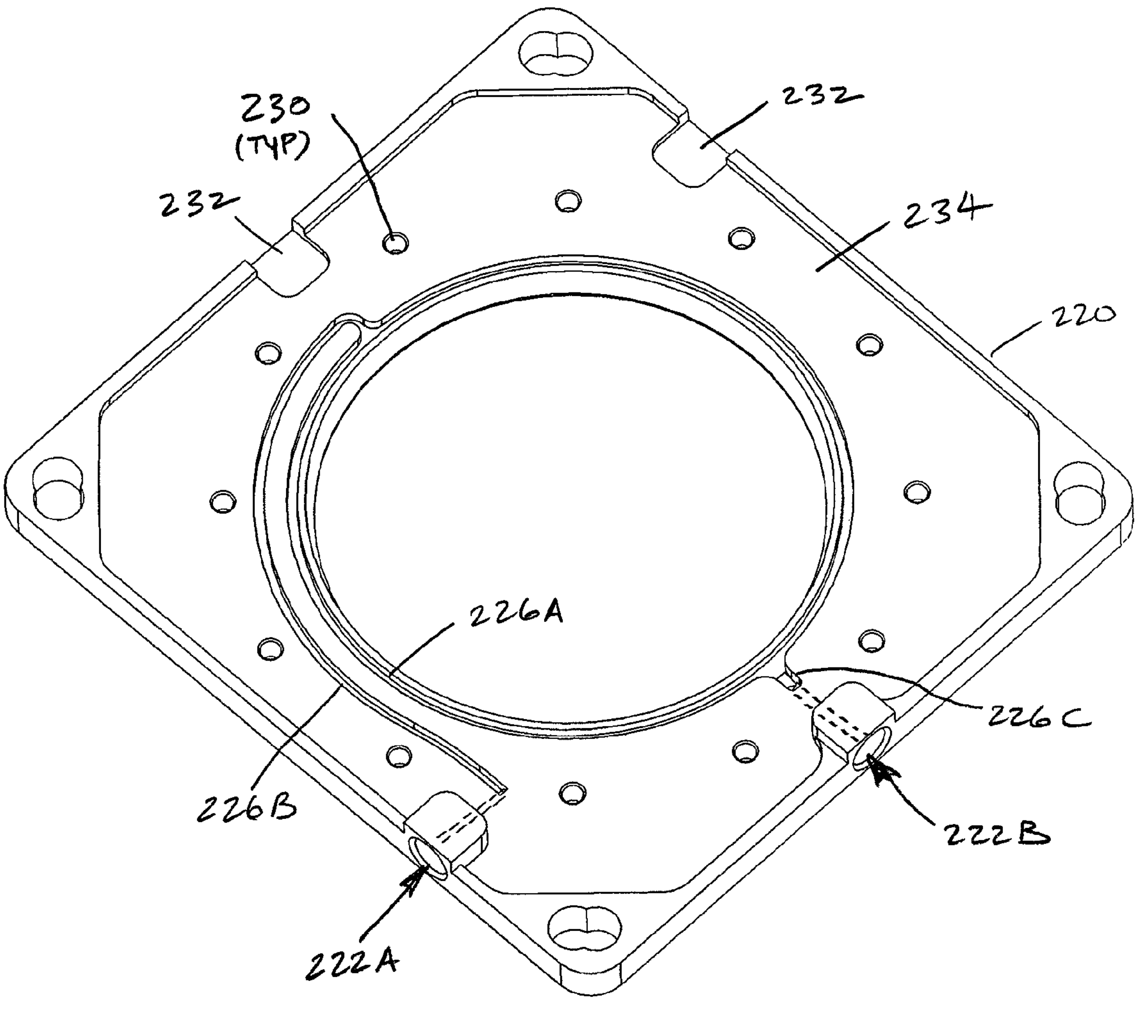
FIG. 34 is a top, front, right perspective view of the bottom plate from the injection plate assembly of FIG. 30.
Figure 35:
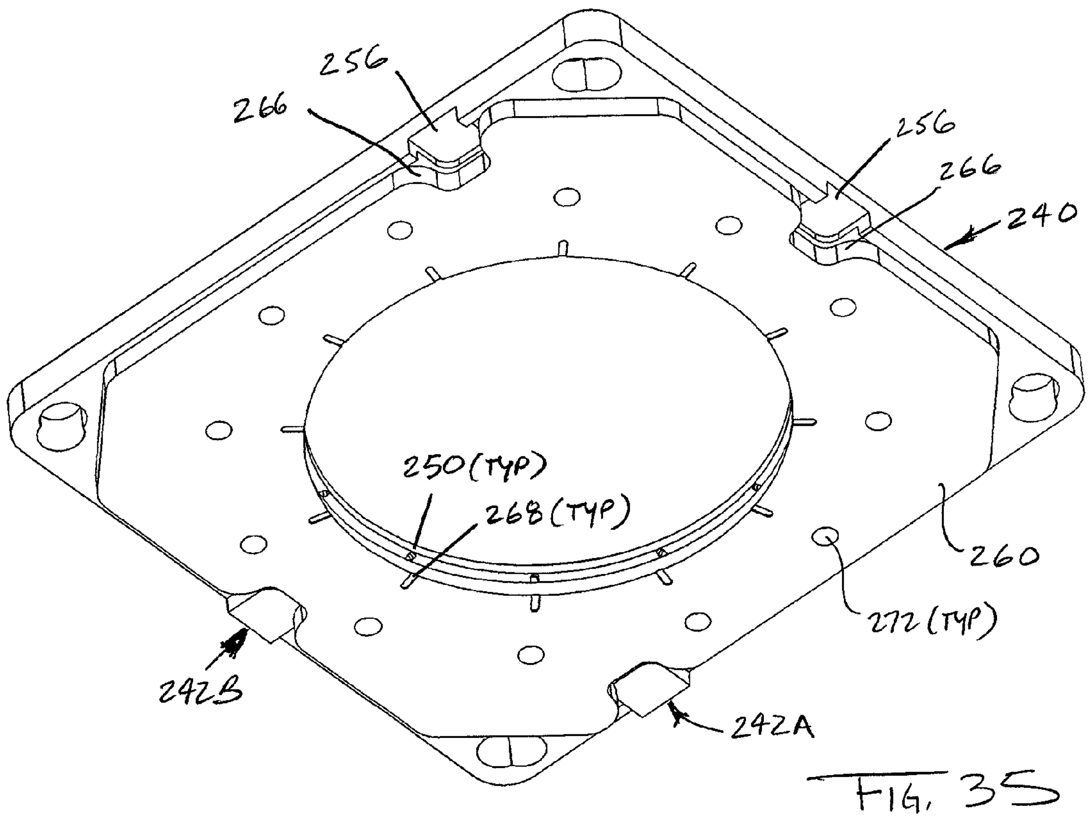
FIG. 35 is a bottom, front, right perspective view of the intermediate plate assembled with the top plate from the injection plate assembly of FIG. 30.
Figure 36:
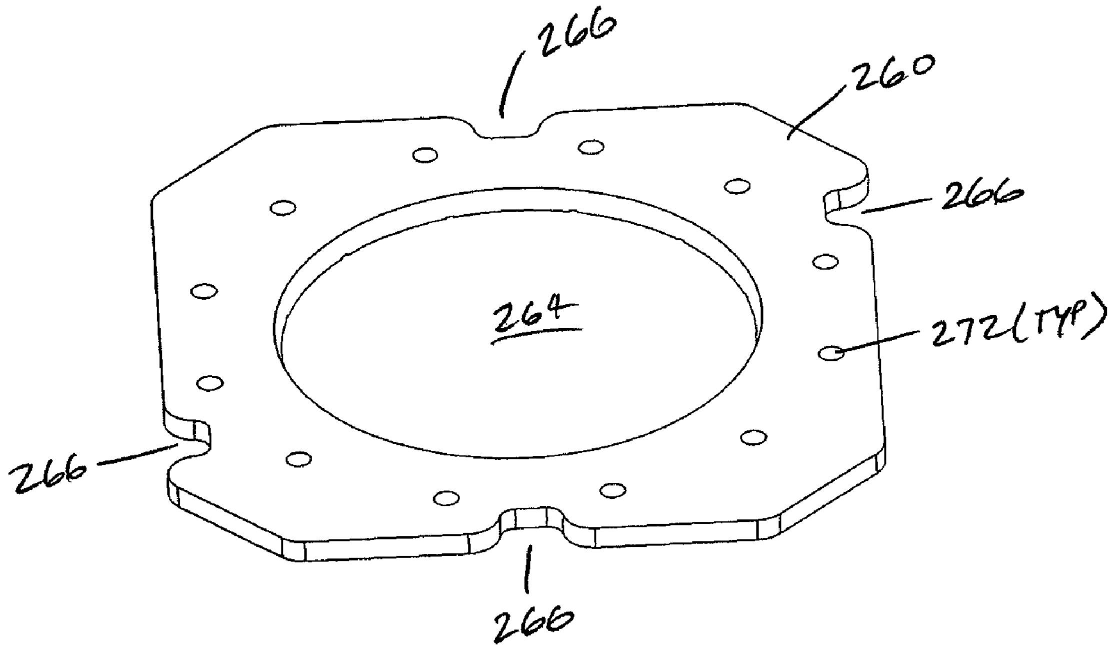
FIG. 36 is a top, front, right perspective view of the intermediate plate from the injection plate assembly of FIG. 30.
Figure 37:
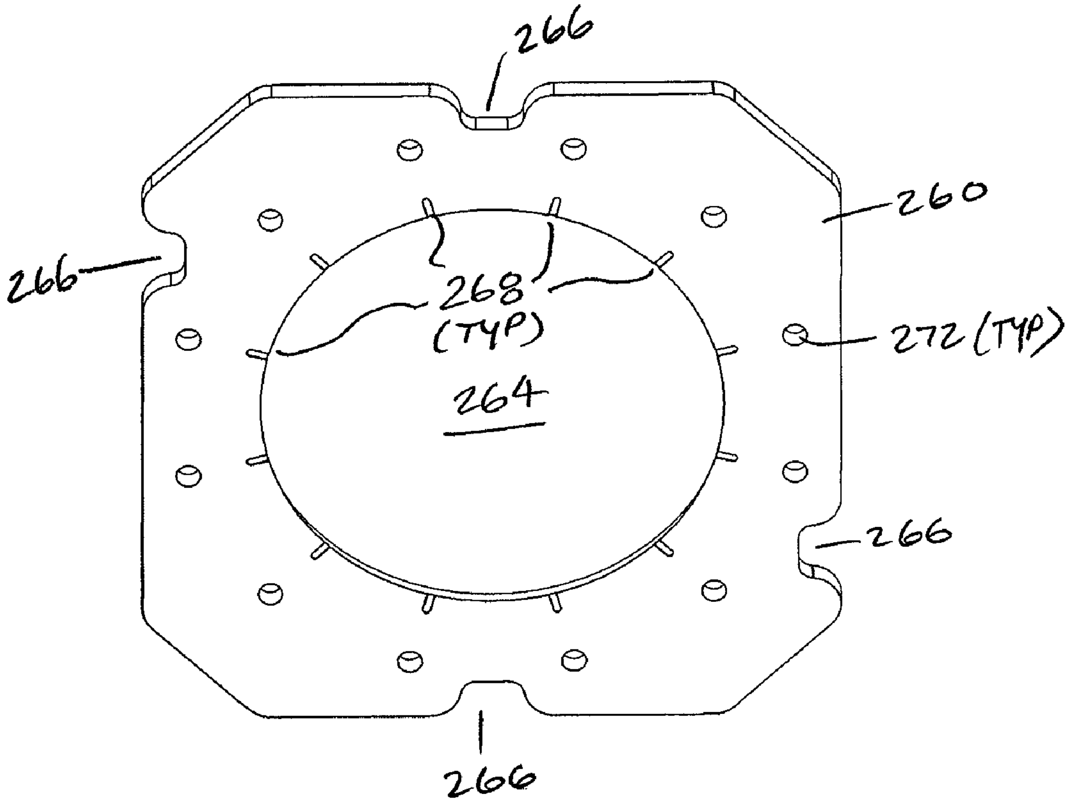
FIG. 37 is a bottom, right perspective view of the intermediate plate from the injection plate assembly of FIG. 30.
Figure 38:
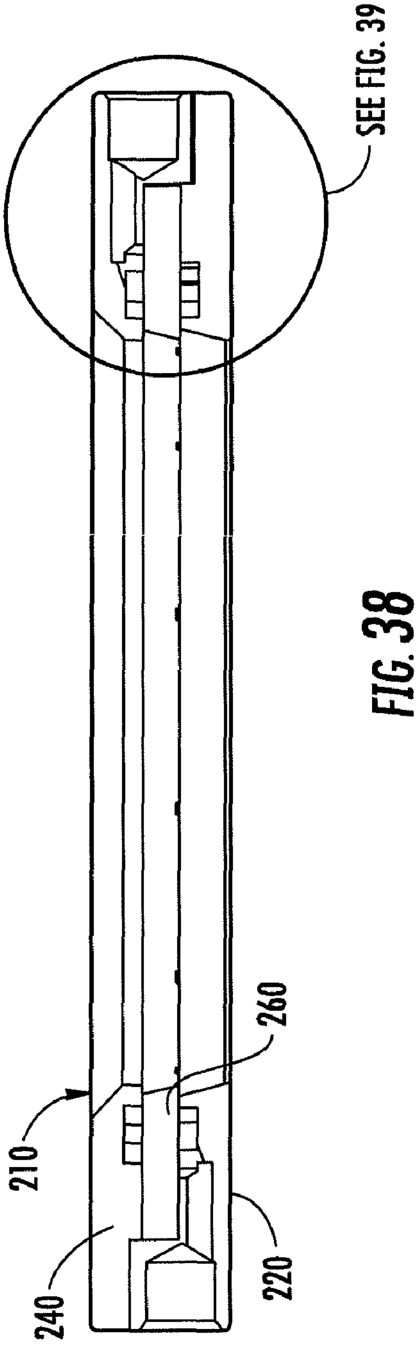
FIG. 38 is a cross-sectional view through the injection plate assembly of FIG. 30.
Figure 39:
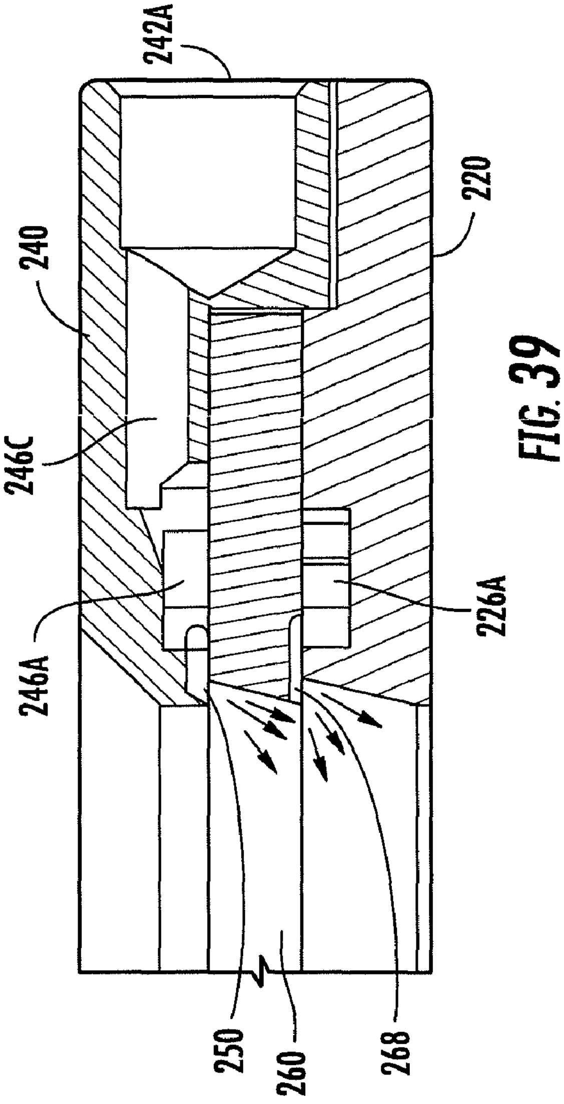
FIG. 39 is an enlarged detail taken in the indicated area of FIG. 38.

As shown in detail in FIGS. 31 and 34, notches 232 are defined on the sides of the lower plate 220 opposite to the fuel inlet ports 222A, 222B for alignment with the upper plate 240 and intermediate plate 260 which are described in detail below. Fastener holes 230 are defined in the lower plate 220 for assembly of the injection plate assembly 210. Additionally, in order to maintain a reduced height for the injection plate assembly 210, a recessed surface 234 is defined over the area surrounding the main aperture 228 and the runners 226.

Still with reference to FIGS. 30-32 and 35-39, an intermediate plate 260 is located on the lower plate 220. The intermediate plate 260 includes a main aperture 264 which is aligned with the main aperture 228 of the lower plate 220 as well as the throttle bore in the manifold. Surrounding the main apertures 264 on a lower side of the intermediate plate 260 are a plurality of spaced apart injection ports 268. In a preferred embodiment, twelve equally spaced injection ports 268 are provided around the periphery of and extending into the main aperture 264. As shown in detail in FIGS. 33 and 39, the injection ports 268 extend such that they overlap both the circular runners 226 surrounding the main aperture 228 of the lower plate 220 as well as the upper lip of the main aperture 228 in the lower plate 220 in order to provide a fluid path from the fuel runner 226 in the lower plate to the main apertures 228 and the throttle bore in the manifold.

Notches 266 are provided along each side of the intermediate plate 260 in aligned positions with the fuel inlet ports 222A, 222B in the lower plate 220 as well as the additive inlet ports 242A, 242B in the upper plate 240, described in further detail below. Aligned fastener holes 272 are provided in complementary positions to the fastener holes 230 of the lower plate 220.

Referring to FIGS. 30-33 and 38-39, the upper plate 240 is located above the intermediate plate 260. The upper plate 240 includes additive inlet ports 242A, 242B that are located on the sides of the injection plate assembly 210 that are opposite to the sides which include the fuel inlet ports 222A, 222B. Fittings (not shown) are provided for connecting the additive inlet ports 242 to additive lines (not shown), such as lines extending from a high pressure accelerant tank, such as a tank of nitrous oxide.

Figure 32:
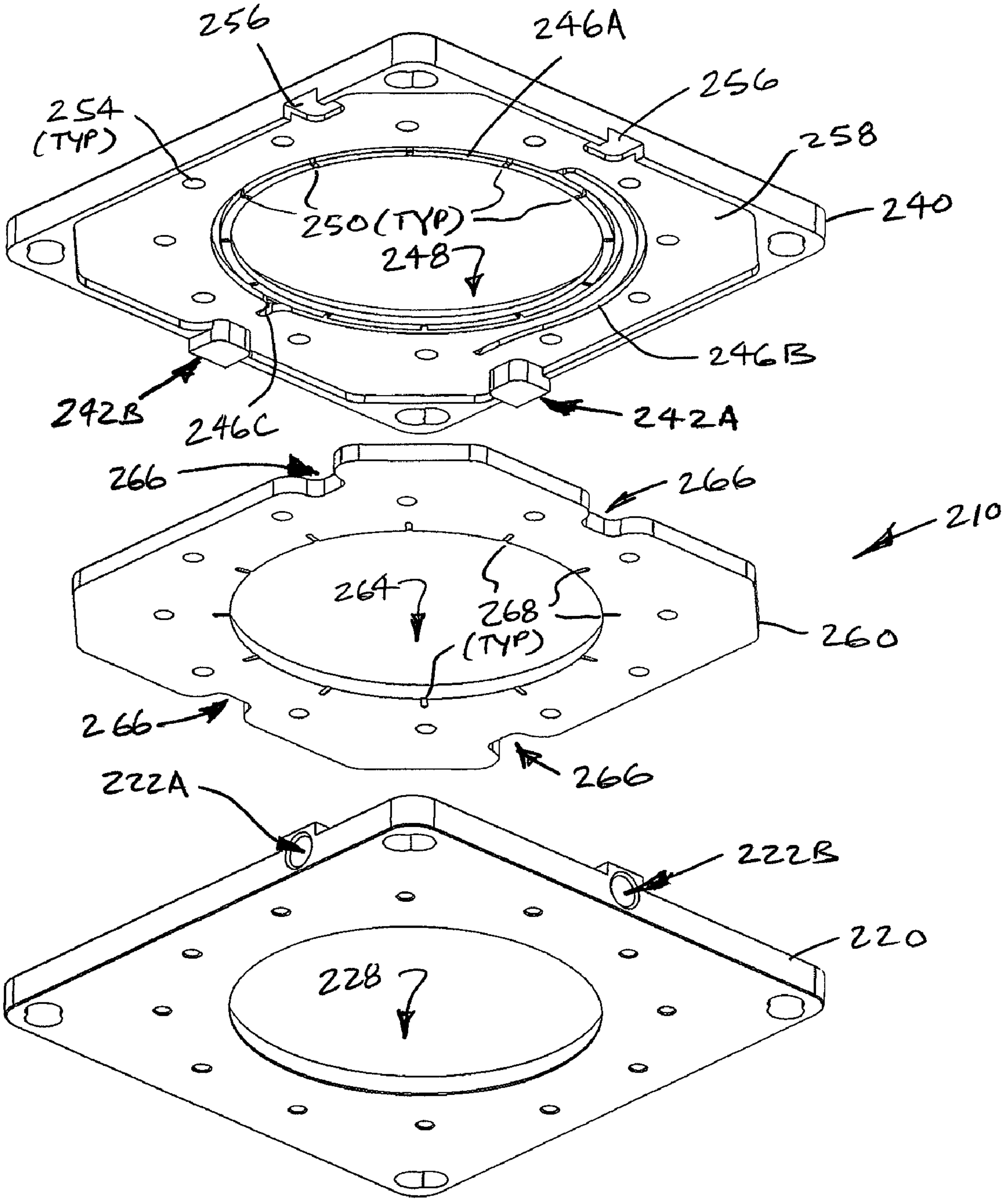
FIG. 32 is an exploded bottom, front, right perspective view of the injection plate assembly of FIG. 30.
Figure 33:
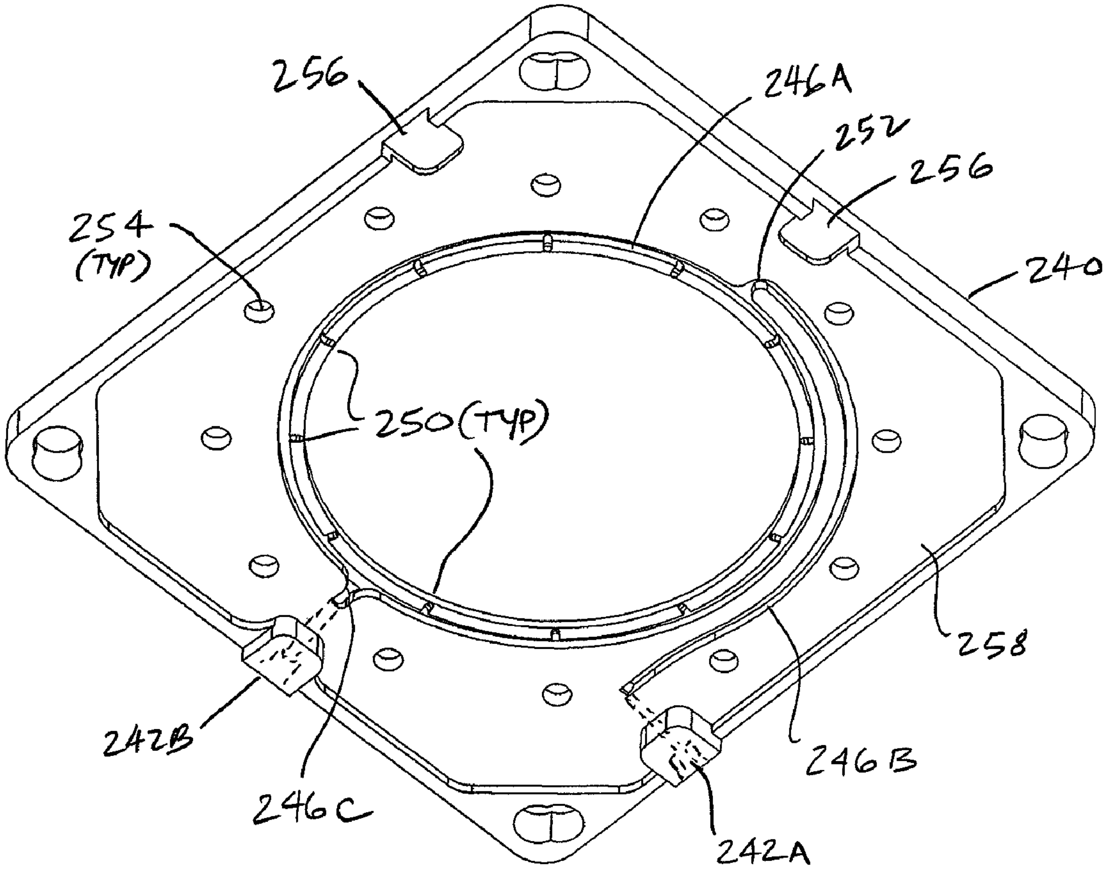
FIG. 33 is a bottom, front, right perspective view of the top plate from the injection plate assembly of FIG. 30.

As shown in detail in FIGS. 32 and 33, runners 246A, B, C for distributing the accelerant to the main aperture 248 are provided to deliver accelerant to opposing sides of the main aperture 248. A circular runner groove 246A surrounds the main aperture 248. Runner segments 246B, C extend between the additive inlet ports 242A, 242B and the circular runner 246A. Runner 246B extends partially around the bore 248 so that it connects to the circular runner 246A at a position opposite to the runner 246C. Preferably, the grooves have a width of approximately 0.07 to 0.10 inches and more preferably have a width in the range of 0.090 to 0.098 inches. The grooves preferably have a depth of 0.08 to approximately 0.01 inches with more preferably a depth in the range of 0.088 to 0.092 inches.

According to the invention, in order to avoid head loss as the high pressure accelerant travels through the runners 246, the internal radius corners 252 on the walls defining the groove path all have a radius of at least 0.10 inches and more preferably of at least 0.125 inches. A plurality of injection gates 250 are located around the main aperture 48 and extend from the circular runner groove 246 to the main apertures 248. The injection gates 250 are similar to the injection gates 44 described in U.S. 2009/0188480, which is incorporated herein by reference as if fully set forth. In order to equalize flow around the bore 248, the connection of the additive inlet ports 242A, 242B to the circular runner 246A is made on opposing sides by having the runner segment 246B extend approximately ¼ of the way around the bore 248 to a position opposite the runner segment 246C. While twelve injection gates 250 are shown for the main apertures 248, fewer or greater numbers of injection gates 250 could be provided.

Figure 30:
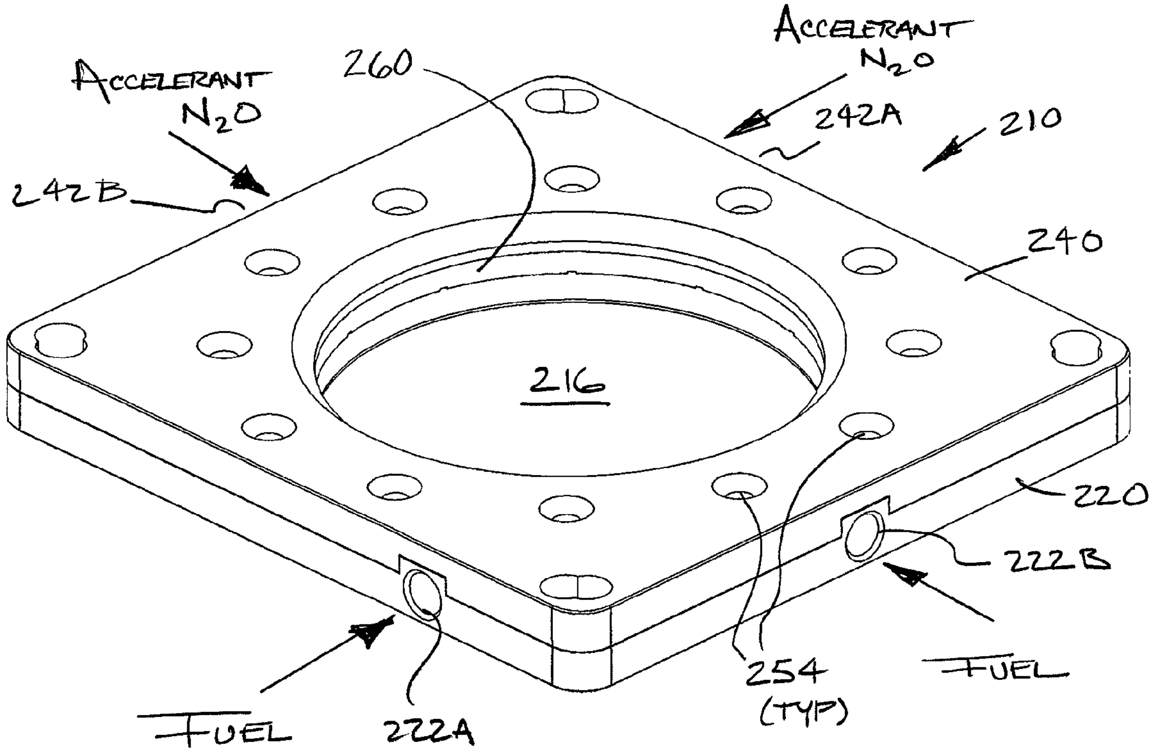
FIG. 30 is a top, front, right perspective view of another embodiment of a single stage injection plate assembly for injection of primary fuel and an additive or accelerant into the manifold of an internal combustion engine.
Figure 31:
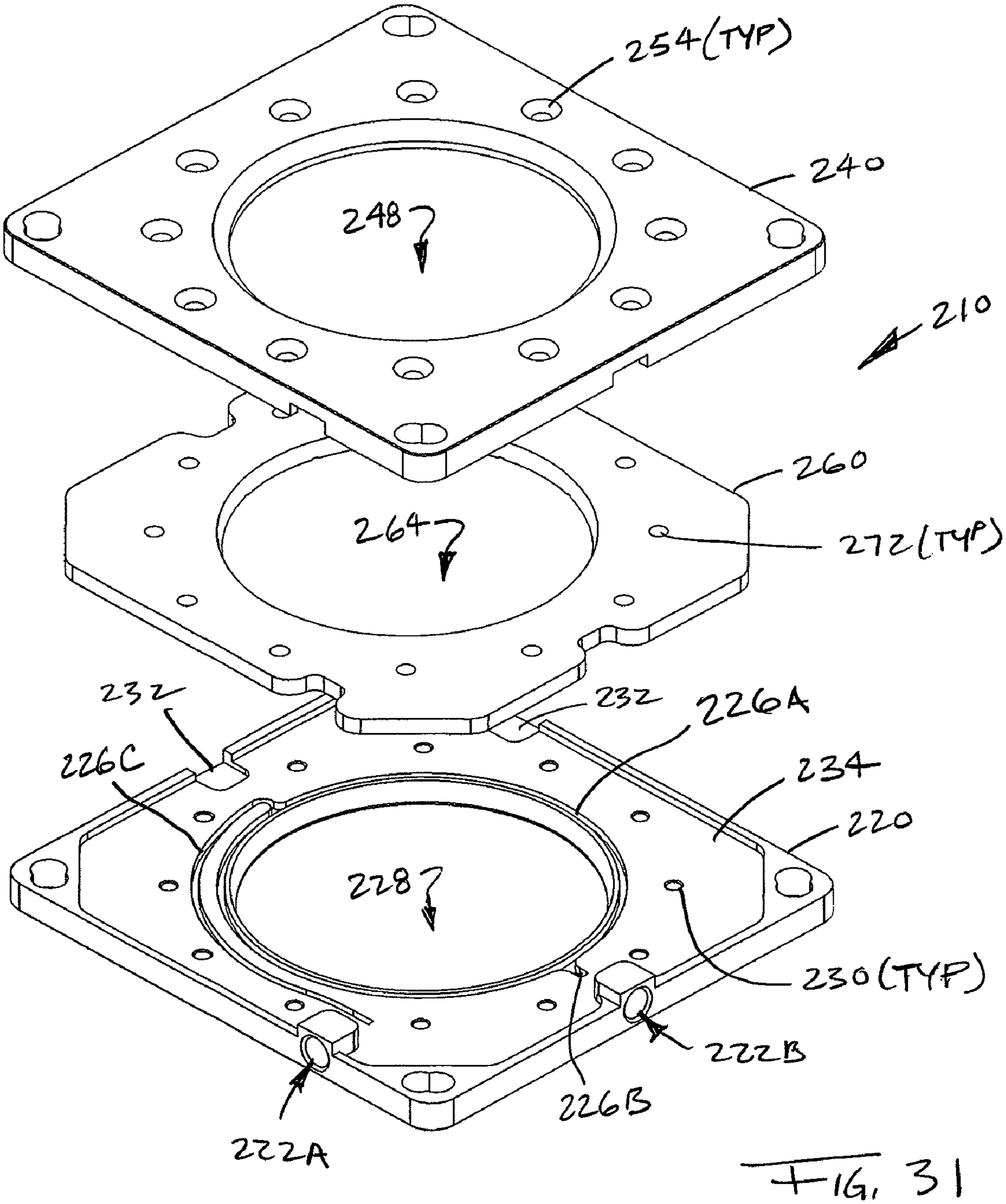
FIG. 31 is an exploded top, front, right perspective view of the injection plate assembly of FIG. 30.

The upper plate 240 also includes fastener holes 254 aligned in position with the fastener holes 230 of the lower plate and, as shown in FIGS. 30 and 31, these holes are preferably counter sunk on the upper surface to receive countersunk fasteners for ease of assembly and to avoid interference with the carburetor base. Notches 256 are provided in aligned positions for receiving the fuel injection ports 222A, 222B from the lower plate 220. Additionally, the lower surface of the upper plate 240 around the main aperture 248 includes an intermediate plate recess 258, which surrounds the main aperture 248.

For assembling of the single stage injection plate assembly 210, the intermediate plate 260 is inserted between the lower plate 220 and upper plate 240. This can be done without gaskets, as shown, or provisions for O-rings or gaskets 70 such as in the first embodiment 10 can be provided. The assembly 210 is then connected together via countersunk screws (not shown) being installed from the upper surface of the upper plate 240. The fittings, such as the fittings 24 and 44 discussed above in connection with the first embodiment are then installed for connection to fuel lines and accelerant lines.

The surface finish of the machined parts is preferably as described in U.S. 2009/0188480 so that gaskets are not necessarily required.

This arrangement provides for pairs of accelerant injection gates 250 located above fuel injection ports 268 distributed around the periphery of the main aperture 228, 248, 264 in order to spray the high pressure accelerant into the fuel delivered by the injection ports 268 down into the throttle bore of the manifold. The high pressure accelerant also creates a venturi effect, drawing additional fuel/air mixture down from the carburetor or throttle body through the main apertures 228, 248, 264 in the plate assembly 210 and into the throttle bore of the manifold 14. This arrangement can provide increases of 100 to 600 or more horsepower from the nominal horsepower of an engine.

The accelerant gate geometry is preferably as described in U.S. 2009/0188480 and accordingly is not being repeated here in detail.

The overall height of the plate assembly 210 is preferably about 0.650 inches, with the upper and lower plates 220 and 240 having an overall height of 0.325 inches each. The single main apertures 228, 248, 264 are preferably 95 mm or 110 mm in diameter. However, other sizes can be used. The lower, upper and intermediate plates 220, 240 and 260 are preferably made of machined steel or aluminum, or alloys thereof.

The injection plate assemblies 10, 110, 210 provide improved performance due to the more uniform distribution of fuel and accelerant to one or more main apertures using one or more injection stages leading to the throttle bore(s) 16 and the manifold in order to provide equal power to each of the combustion chambers of the internal combustion engine. This provides a marked improvement over the prior known device.

It is also possible to use the injection plate assembly to just inject an accelerant or an accelerant/fuel mixture in the case of direct fuel injected engines.

Those skilled in the art will appreciate that various other modifications can be made to the injection plate assembly 10, 110, 210 for spray injection of a fuel/accelerant mix described above which would still fall within the scope of the present invention which is defined by the appended claims.

What is claimed is:

1. An injection plate assembly for an internal combustion engine that includes a manifold and carburetor or throttle body, for injection of a primary fuel and an accelerant into a throttle bore of the manifold, the injection plate assembly comprising:

a lower plate having a main aperture adapted to be aligned with a throttle bore of the manifold, with fuel runners defined in the lower plate for carrying the primary fuel from fuel inlet ports to the main aperture;

an intermediate plate located on the lower plate that includes an aligned main aperture, and a plurality of fuel injection ports are defined in a lower face of the intermediate plate which established a fluid path with the fuel runners in the lower plate in order to allow fuel to be injected into the main aperture;

an upper plate located over the intermediate plate that includes accelerant runners in fluid communication between accelerant inlet ports and injection gates located around a main aperture in the upper plate, the main apertures in the lower plate, intermediate plate and upper plate are aligned with the throttle bore of the manifold in order to inject a high pressure accelerant and fuel into the main aperture, the injection gates in the upper plate are located above and in aligned positions with the fuel injection ports defined between the intermediate plate and the lower plate forming a plurality of fuel injection port/accelerant gate pairs, and in order to equalize injection of both the primary fuel and the accelerant, the lower plate includes the fuel inlet ports that deliver the primary fuel via the fuel runners at opposing sides of the lower plate, the accelerant inlet ports deliver the accelerant via the accelerant runners at opposite sides of the upper plate, with the accelerant inlet ports being located on different sides of the injection plate assembly from the fuel inlet ports.

2. The injection plate assembly of claim 1, wherein the main aperture in the lower plate, the intermediate plate and the upper plate consists of a single main aperture aligned with the throttle bore.

3. The injection plate assembly of claim 2, wherein twelve pairs of the fuel injection port/accelerant gate pairs are located generally equally spaced about the main aperture.

4. The injection plate assembly of claim 2, wherein the fuel runners comprise a generally circular runner located in the lower plate around the single main aperture, and runner segments which direct the fuel from the fuel inlet ports to diametrically opposed connection positions to the generally circular runner.

5. The injection plate assembly of claim 4, wherein the fuel inlet ports are located on opposite sides of the injection plate assembly and connect to the generally circular runner at the diametrically opposed connection positions.

6. The injection plate assembly of claim 4, wherein the fuel inlet ports are located on adjacent sides of the injection plate assembly, and at least one of the fuel runner segments extends from one of the fuel inlet ports partially around the circular runner so that the connections of the fuel runner segments to the generally circular runner are at the diametrically opposed connection positions.

7. The injection plate assembly of claim 4, wherein the fuel injection ports in the intermediate plate connect the generally circular runner to the main aperture.

8. The injection plate assembly of claim 4, wherein the accelerant runners comprise a generally circular accelerant runner located in the upper plate around the single main aperture, and accelerant runner segments which direct the accelerant from the accelerant inlet ports to diametrically opposed connection positions to the generally circular accelerant runner.

9. The injection plate assembly of claim 8, wherein the accelerant inlet ports are located on opposite sides of the injection plate assembly, on sides adjacent to the sides with the fuel inlet ports, and connect to the generally circular accelerant runner at the diametrically opposed connection positions.

10. The injection plate assembly of claim 8, wherein the accelerant inlet ports are located on adjacent sides of the injection plate assembly, and at least one of the accelerant runner segments extends from one of the accelerant inlet ports partially around the generally circular accelerant runner so that the connections of the accelerant runner segments to the generally circular accelerant runner are at the diametrically opposed connection positions.

11. The injection plate assembly of claim 8, wherein the accelerant gates are formed in the upper plate around the main aperture and connect the generally circular accelerant runner to the main aperture.

12. The injection plate assembly of claim 11, wherein the accelerant gates have a discharge opening angled in a direction of air flow through the main aperture.

13. An injection plate assembly for an internal combustion engine that includes a manifold and carburetor or throttle body, for injection of a primary fuel and an accelerant into a throttle bore of the manifold, the injection plate assembly comprising:

- a lower plate having four main apertures adapted to be aligned with throttle bores of the manifold, with fuel runners defined in the lower plate for carrying the primary fuel from fuel inlet ports to the main apertures;
- an intermediate plate located on the lower plate that includes four aligned main apertures, and a plurality of fuel injection ports are defined in a lower face of the intermediate plate which established a fluid path with the fuel runners in the lower plate in order to allow fuel to be injected into the four main apertures;
- an upper plate located over the intermediate plate that includes accelerant runners in fluid communication between accelerant inlet ports and injection gates located around four main apertures in the upper plate, the four main apertures in the lower plate, intermediate plate and upper plate are aligned with the throttle bores of the manifold in order to inject a high pressure accelerant and fuel into the main apertures, the injection gates in the upper plate are located above and in aligned positions with the fuel injection ports defined between the intermediate plate and the lower plate forming a plurality of fuel injection port/accelerant gate pairs, and in order to equalize injection of both the primary fuel and the accelerant, the lower plate includes the fuel inlet ports that deliver the primary fuel via the fuel runners at opposing sides of the lower plate, the accelerant inlet ports deliver the accelerant via the accelerant runners at opposite sides of the upper plate, with the accelerant inlet ports being located on different sides of the injection plate assembly from the fuel inlet ports.

14. The injection plate assembly of claim 13, wherein there are at least 6 of the fuel inlet ports/accelerant gates at each of the main apertures.

15. The injection plate assembly of claim 13, wherein the fuel inlet ports are located on opposing sides of the lower plate, the fuel runners comprise generally circular runner grooves that extend at least partly around each of the main apertures.

16. The injection plate assembly of claim 13, wherein the accelerant runners in the upper plate define paths with internal corners having a radius of 0.10 inches or greater.

17. The injection plate assembly of claim 13, wherein the accelerant runners in the upper plate define paths with internal corners having a radius of 0.10 inches or greater.

18. A multi-stage injection plate assembly for an internal combustion engine that includes a manifold and carburetor or throttle body, for injection of a primary fuel and an accelerant into a throttle bore of the manifold, the multi-stage injection plate assembly comprising:

- a lower plate having a main aperture adapted to be aligned with a throttle bore of the manifold, with a fuel runner defined in the lower plate for carrying the primary fuel from lower plate fuel inlet ports to the main aperture;
- a first intermediate plate located on the lower plate that includes an aligned main aperture, and a plurality of fuel injection ports are defined in a lower face of the first intermediate plate which established a fluid path with the fuel runner in the lower plate in order to allow fuel to be injected into the main aperture;

a middle plate having a lower surface and an upper surface, the lower surface includes a middle plate accelerant runner in fluid communication between middle plate accelerant inlet ports and middle plate injection gates located around a main aperture in the middle plate, the upper surface having a middle plate fuel runner defined in the middle plate for carrying the primary fuel from middle plate fuel inlet ports to the main aperture;

a second intermediate plate located on the middle plate that includes an aligned main aperture, and a plurality of fuel injection ports are defined in a lower face of the second intermediate plate which established a fluid path with the middle plate fuel runner in order to allow fuel to be injected into the main aperture;

an upper plate located over the second intermediate plate that includes an upper plate accelerant runner in fluid communication between upper plate accelerant inlet ports and upper plate injection gates located around a main aperture in the upper plate;

the main apertures in the lower plate, the intermediates plates, the middle plate and the upper plate are aligned with the throttle bore of the manifold in order to inject a high pressure accelerant and fuel into the main aperture, the middle plate injection gates are located above and in aligned positions with the lower plate fuel injection ports defined between the first intermediate plate and the lower plate forming a plurality of first stage fuel injection port/accelerant gate pairs, the upper plate injection gates are located above and in aligned positions with the middle plate fuel injection ports defined between the second intermediate plate and the middle plate forming a plurality of second stage fuel injection port/accelerant gate pairs;

and in order to equalize injection of both the primary fuel and the accelerant, the fuel runners of the lower plate and the middle plate deliver fuel from the fuel inlets at opposing sides of the lower plate and the middle plate, and the accelerant runners in the middle plate and the upper plate deliver the accelerant at opposite sides of the upper plate, with the accelerant inlet ports being located on different sides of the injection plate assembly from the fuel inlet ports.

19. The injection plate assembly of claim 18, wherein the accelerant runners in the middle plate and the upper plate define paths with internal corners having a radius of 0.10 inches or greater.

* * * * *